(12) United States Patent
Zaima

(10) Patent No.: US 7,385,737 B2
(45) Date of Patent: Jun. 10, 2008

(54) IMAGE PROCESSING APPARATUS AND ITS CONTROL METHOD

(75) Inventor: Nobuhiko Zaima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 10/327,185

(22) Filed: Dec. 24, 2002

(65) Prior Publication Data

US 2003/0128381 A1 Jul. 10, 2003

(30) Foreign Application Priority Data

Jan. 7, 2002 (JP) ............................. 2002-000690

(51) Int. Cl.
*H04N 1/46* (2006.01)
(52) U.S. Cl. ...................... 358/504; 358/505; 358/518; 399/72; 399/302
(58) Field of Classification Search ................ 358/298, 358/520, 1.9, 504, 505, 518, 0.523, 524, 358/296, 406; 399/46, 66, 67, 72, 297, 302
See application file for complete search history.

(56) References Cited

U.S. PATENT DOCUMENTS 6,034,788 A 3/2000 Sasanuma et al. .......... 358/406

| 6,215,968 | B1 * | 4/2001 | Uehara et al. ............... 399/49 |
| 6,418,281 | B1 | 7/2002 | Ohki ......................... 399/49 |
| 6,456,803 | B2 | 9/2002 | Suzuki et al. ............... 399/49 |
| 6,750,993 | B1 * | 6/2004 | Shirai ........................ 358/504 |

FOREIGN PATENT DOCUMENTS

| JP | 5-254196 A | 10/1993 |
| JP | 7-219303 A | 8/1995 |
| JP | 10-171185 | 6/1998 |
| JP | 2001-188420 A | 7/2001 |

\* cited by examiner

*Primary Examiner*—Gabriel I. Garcia
*Assistant Examiner*—Vu Hang
(74) *Attorney, Agent, or Firm*—Fitzpatrick, Cella, Harper & Scinto

(57) ABSTRACT

Image control which requires time and troublesome work cannot be frequently performed, and image quality such as tonality reproducibility cannot be sufficiently stabilized in correspondence with constantly varying image characteristic of image forming apparatus. Accordingly, a density correction characteristic of image processing apparatus is controlled based on an image characteristic of pattern formed on a print sheet, then the image characteristic of pattern formed on an electrostatic drum is held as reference information. Upon normal image formation, a pattern is formed without an image formation area on the electrostatic drum, and the density correction characteristic is corrected based on the difference between the image characteristic of the pattern and the reference information.

21 Claims, 29 Drawing Sheets

FIG. 10
REMOVE TEST PRINT 1 FROM ORIGINAL PLATE, AND OUTPUT TEST PRINT TO BE USED NEXT [CANCEL]
TEST PRINT 2 — 150
PRINTING [CANCEL]
TEST PRINT 2 — 150
PLACE OUTPUT TEST PRINT 2 FACE DOWN ON ORIGINAL PLATE WITH BLACK BAND ON BACK SIDE, AND DEPRESS READ KEY [CANCEL]
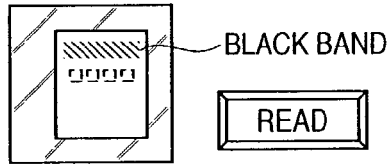
BLACK BAND
READ
READING [CANCEL]
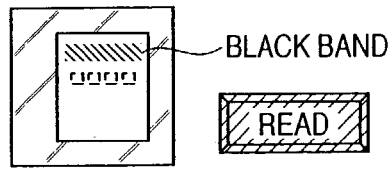
BLACK BAND
READ
AUTOMATIC TONALITY CORRECTION COMPLETED [CANCEL]
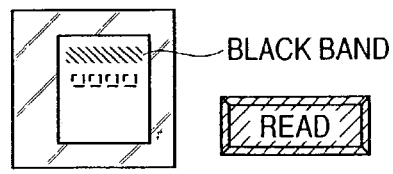
BLACK BAND
READ F I G. 28
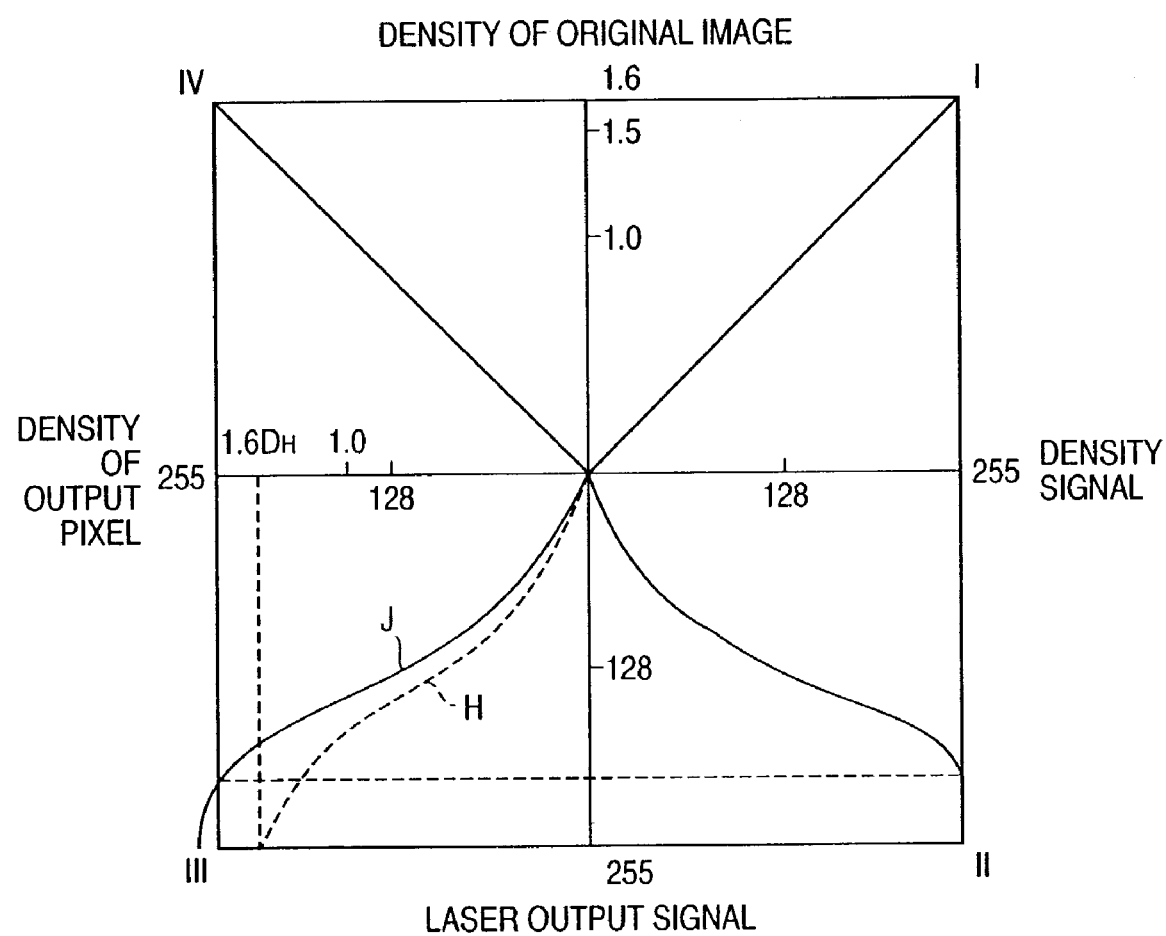

IMAGE PROCESSING APPARATUS AND ITS CONTROL METHOD

FIELD OF THE INVENTION

The present invention relates to an image processing apparatus and its control method, and more particularly, to image control upon color image formation.

BACKGROUND OF THE INVENTION

As a method for controlling an image processing characteristic of image forming apparatus such as a copier or a printer (referred to as an "image control method"), the following method is known.

An image forming apparatus is started, and after the completion of warm-up operation, a particular pattern is formed on an image holding member such as an electrostatic drum. Then, the density of the formed pattern is read, and the operation of circuit to determine an image forming condition such as a gamma corrector is changed based on the read density value, thus the quality of formed image is stabled.

Further, in a case where a tonality characteristic of the image forming apparatus is changed due to change of environmental condition, the particular pattern is again formed on the image holding member, then the pattern is read, and the read value is fed back to the circuit to determine the image forming condition such as a gamma corrector, thereby the image quality can be stabled in correspondence with change of environmental condition.

Further, in a case where the image forming apparatus is used for long time, the density of pattern on the image holding member may not correspond with that of actually print-outputted image. Accordingly, known is a method for forming a particular pattern on a recording medium and correcting an image forming condition based on the density value of the pattern.

Further, known is a method for converting a gamma look-up table (γGLUT) or generating a γLUT modulation table based on density information of one image pattern, and adding required correction information to a gamma corrector.

In the above methods, much time and troublesome work are required for the control, therefore image control cannot be performed frequently. Accordingly, it cannot be said that image quality such as tonality reproducibility is sufficiently stabilized in correspondence with constantly varying image characteristic of image forming apparatus. Further, in the method for correcting the γLUT by density information of one image pattern and adding correction information to the gamma corrector, which can correct the gamma corrector, comparatively easily, if the number of addition increases, the difference between gray scale levels of γLUT cannot be ignored, and pseudo outlines occur.

SUMMARY OF THE INVENTION

The present invention has been made so as to solve the above problems individually or collectively and has its object to provide image control which can be frequently performed without time and troublesome work. Further, another object of the present invention is to provide image control which can attain high precision and highly-stable tonality of output image.

Accordingly, the foregoing objects are attained by providing an image processing apparatus for forming a color image on an image holding member based on image data, and transferring and fixing the color image onto a print medium, comprising: a first detector, arranged to detect an image characteristic of the image transferred and fixed onto the print medium; a second detector, arranged to detect an image characteristic of an image formed on the image holding member; a controller, arranged to form a first pattern to detect an image characteristic on the print medium by a sequence different from normal image formation, and control a condition for image formation on the image holding member based on the image characteristic of the first pattern, detected by the first detector; and a corrector, arranged to form a second pattern to detect an image characteristic on the image holding member after completion of control of the condition for image formation by the controller, hold the image characteristic of the second pattern detected by the second detector as reference information, and in the normal image formation, form the second pattern without an image formation area on the image holding member in the normal image formation, and correct the condition for image formation controlled by the controller, based on a difference between the image characteristic of the second pattern detected by the second detector and the reference information.

Further, the foregoing objects are attained by providing a control method of an image processing apparatus for forming a color image on an image holding member based on image data, and transferring and fixing the color image onto a print medium, comprising the steps of: forming a first pattern to detect an image characteristic on the print medium by a sequence different from normal image formation; detecting the image characteristic of the first pattern transferred and fixed onto the print medium; controlling a condition for image formation on the image holding member based on the image characteristic of the first pattern; forming a second pattern to detect an image characteristic on the image holding member after completion of control of the condition for image formation; detecting the image characteristic of the second pattern formed on the image holding member as reference information; forming the second pattern without an image formation area on the image holding member in the normal image formation; and detecting the image characteristic of the second pattern formed without the image formation area, and correcting the condition for image formation based on a difference between the detected image characteristic and the reference information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8, 9, and 10 are examples of image on a display unit;

FIG. 28 is a graph showing a density conversion characteristic after control.

DETAILED DESCRIPTION OF THE PREFERRED EMBODIMENTS

Preferred embodiments of image processing apparatus of the present invention will now be described in detail in accordance with the accompanying drawings.

First Embodiment

[Structure]

Figure 1:
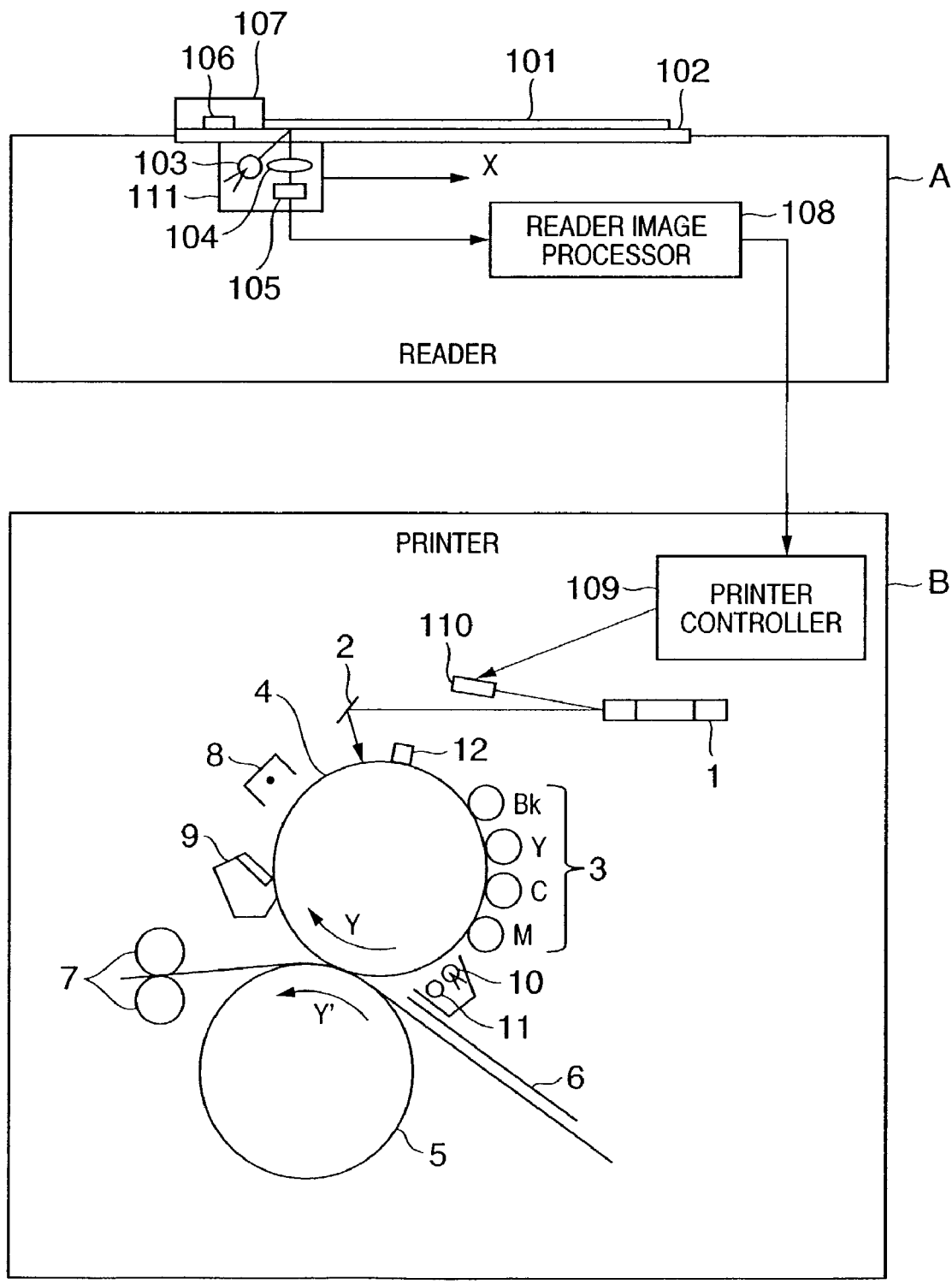
FIG. 1 is a cross-sectional view showing the structure of image processing apparatus according to an embodiment of the present invention.

FIG. 1 is a cross-sectional view showing the structure of the image processing apparatus according to a first embodiment of the present invention.

Reader

An original 101, placed on an original glass plate 102 of a reader A, is irradiated with light from a light source 103, and image formation is made by a CCD sensor 105 from reflection light from the original 101 via an optical system 104. The CCD sensor 105, having a CCD line sensor group including 3 arrays of red, green and blue CCD line sensors, generates red, green and blue color component signals by line sensor. A reading optical system 111 including the light source 103, the optical system 104 and the CCD sensor 105 is moved in an arrow X direction in FIG. 1, and converts the image of the original 101 into an electric signals by line.

A positioning member 107, against which one side of the original 101 abuts, for prevention of skewed placement of the original, and a reference white plate 106 for shading correction in a thrust direction of the CCD sensor 105, are provided on the original glass plate 102.

An image signal obtained by the CCD sensor 105 is subjected to image processing by a reader image processor 108, then sent to a printer B, and processed by a printer controller 109.

Figure 2:
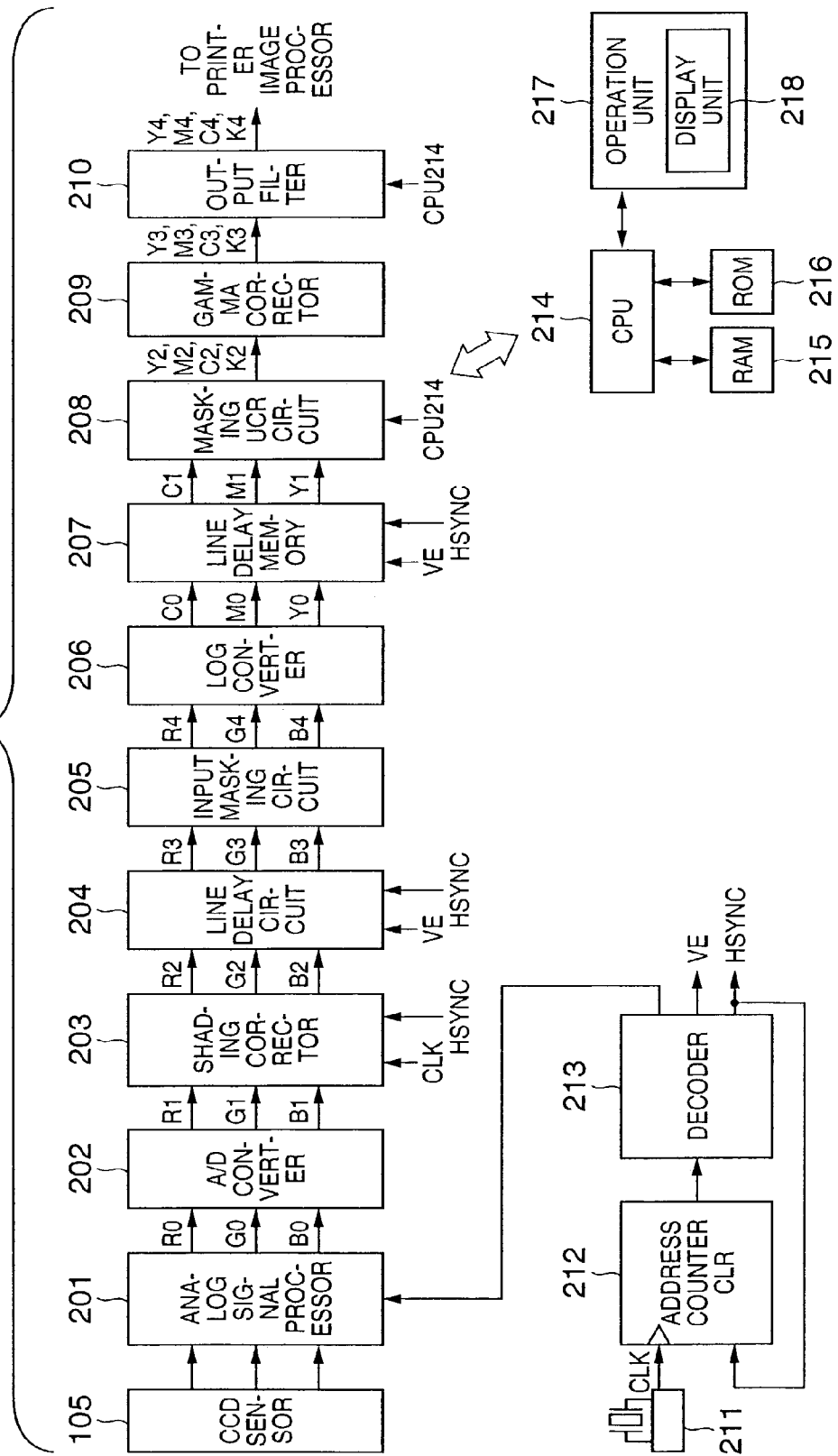
FIG. 2 is a block diagram showing the flow of image signal in a reader image processor.

FIG. 2 is a block diagram showing the flow of the image signal in the reader image processor 108.

As shown in FIG. 2, the image signal, outputted from the CCD sensor 105, is inputted into an analog signal processor 201, then subjected to gain and offset control, and converted by an A/D converter 202 into respective 8-bit color digital image signals R1, G1 and B1. The image signals R1, G1 and B1 are inputted into a shading corrector 203 and subjected to the well-known shading correction for each color using a signal read from the reference while plate 106.

A clock generator 211 generates a clock CLK in 1-pixel units. Further, an address counter 212 counts the clock CLK, generates a main-scanning address signal and outputs the signal by 1 line. A decoder 213 decodes the main-scanning address signal, and generates a line-unit CCD drive signals such as shift pulse and reset pulse, a signal VE indicating an effective area in a 1-line read signal outputted from the CCD sensor 105 and a line synchronizing signal HSYNC. Note that the address counter 212 is cleared by the signal HSYNC, and starts counting for the main-scanning address signal of the next line.

The respective line sensors of the CCD sensor 105 are arrayed, with predetermined spacing, in a subscanning direction. Accordingly, a line delay circuit 204 corrects spatial shift of the image signal in the subscanning direction. More particularly, the R and G signals are line-delayed with respect to the B signal in the subscanning direction, thereby the spatial positions of the RGB signals are corrected.

An input masking circuit 205 converts the color space (read color space) of the input image signal, determined by spectral characteristic of the RGB filter of the CCD sensor 105, into predetermined color space (e.g., standard color space such as sRGB or NTSC) by the following matrix calculation:

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix} \quad (1)$$

A LOG converter 206, having a look-up table ROM, converts luminance signals R4, G4 and B4 into density signals C0, M0 and Y0. The signals C0, M0 and Y0 are delayed in a line delay memory 207 by the amount of line delay until a determination signal such as UCR, FILTER or SEN is generated from the image signals R4, G4 and B4 and outputted from a black character determination unit (not shown).

A masking UCR circuit 208 extracts a black signal Bk from input 3 primary-color signals Y1, M1 and C1, further performs calculation for correction on color mixture of printing color materials in the printer B, then outputs image signals Y2, M2, C2 or Bk2 sequentially by a predetermined bit width (e.g. 8 bits) upon each reading operation. A gamma corrector 209 performs density correction on the image signals to attain ideal tonality characteristic of the printer B. Further, an output filter 210 performs edge emphasis or smoothing processing on the image signals.

Frame-sequential image signals M4, C4, Y4 and Bk4, obtained by these processings, are sent to a printer controller 109, then converted into a pulse width-modulated pulse signal. Then color image printing is performed by the printer B.

Further, a CPU 214 controls the reader A and performs image processing while using a RAM 215 as a work memory, in accordance with a program stored in a ROM 216. An operator inputs instructions to the CPU 214 and/or processing condition by using an operation unit 217. A display unit 218 displays an operation status of the image processing apparatus and set processing condition and the like.

Figure 3:
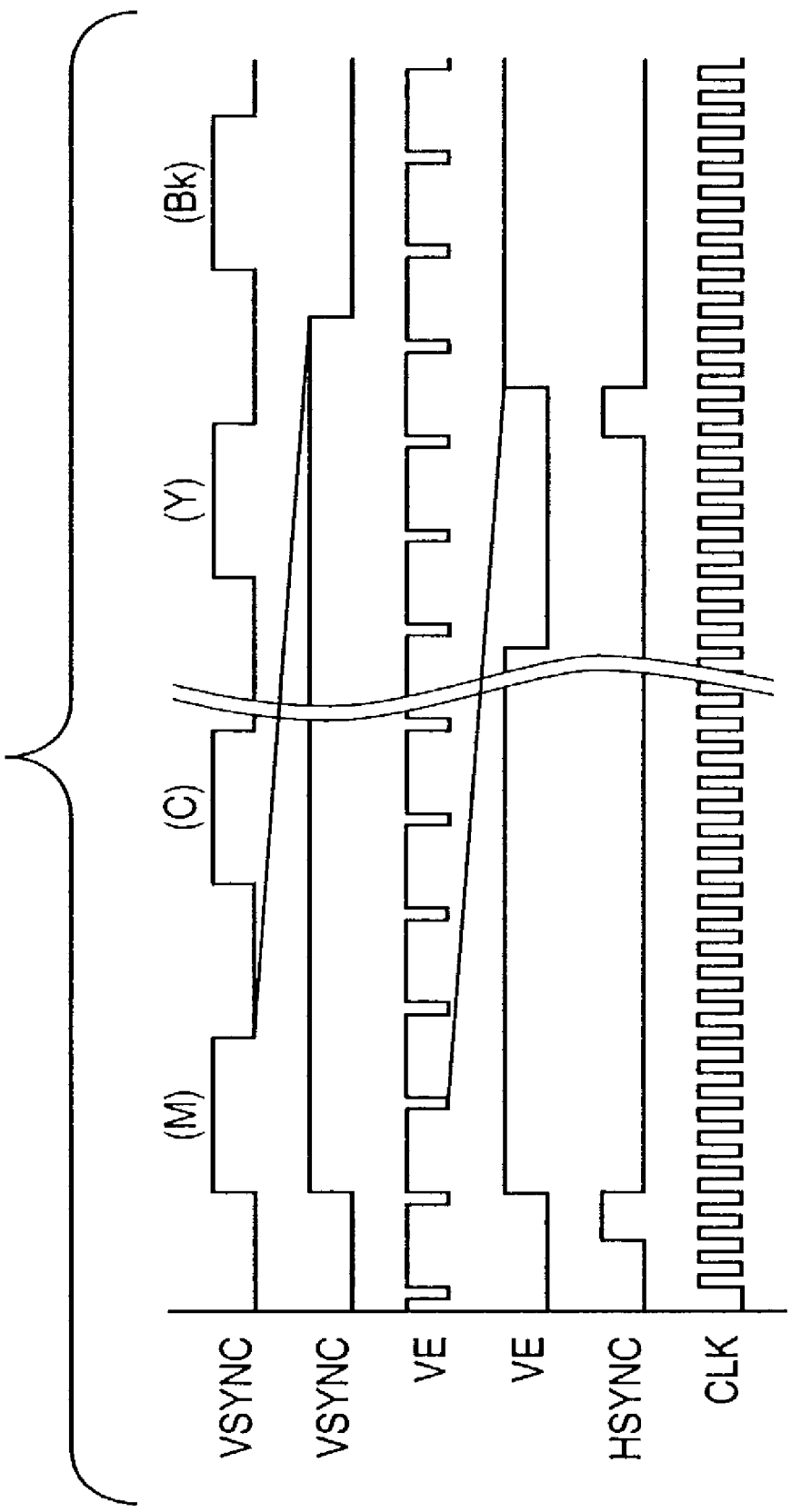
FIG. 3 is a timing chart showing respective signals in an image processor.

FIG. 3 is a timing chart showing the respective signals in the image processor 108.

In FIG. 3, a signal VSYNC is an image effective section signal in the subscanning direction. In a logic "1" section, image reading (scanning) is performed, and output signals C, M, Y and Bk are sequentially generated. A signal VE is an image effective section signal in the main scanning direction. In a logic "1" section, timing of main-scanning start position is set. It is mainly used for line count control for line delay. A signal CLK is a pixel synchronizing signal. At the leading timing "0"→"1", image data is transferred.

Printer

In FIG. 1, the surface of electrostatic drum 4, which turns in an arrow Y direction in the figure, is uniformly charged by a primary charger 8. The printer controller 109 outputs a pulse signal corresponding to input image data by a laser driver. A laser light source 110 outputs laser light corresponding to the input pulse signal. The laser light is reflected by a polygon mirror 1 and a mirror 2, and scanned on the charged surface of the electrostatic drum 4. By the scanning of the laser light, an electrostatic latent image is formed on the surface of the electrostatic drum 4.

The electrostatic latent image formed on the surface of the electrostatic drum 4 is developed for the respective colors by a developer 3 using respective color toner. In the embodiment, 2-component toner is used, and respective color developers, black Bk, yellow Y, cyan C and magenta M from the upstream, are provided around the electrostatic drum 4. A developer corresponding to an image formation color comes close to the electrostatic drum 4 and develops the electrostatic latent image.

A print sheet 6 is wound around a transfer drum 5 which turns once per each color. The toner images of the respective colors are transferred onto the print sheet 6 by 4 times of turning of the transfer drum 5. When the transfer has been completed, the print sheet 6 is separated from the transfer drum 5, then the toner is fixed by a pair of fixing rollers 7, thus full-color image printing is completed.

Further, a surface potential sensor 12 for measurement of surface potential of the electrostatic drum 4, a cleaner 9 for cleaning of remaining toner, which has not been transferred, on the electrostatic drum 4, an LED light source 10 and a photo diode 11 for detection of the amount of reflection light from a toner patch formed on the electrostatic drum 4, are provided on the upstream side of the developer 3 (the head of the arrow Y is on the downstream side) around the electrostatic drum 4.

Figure 4:
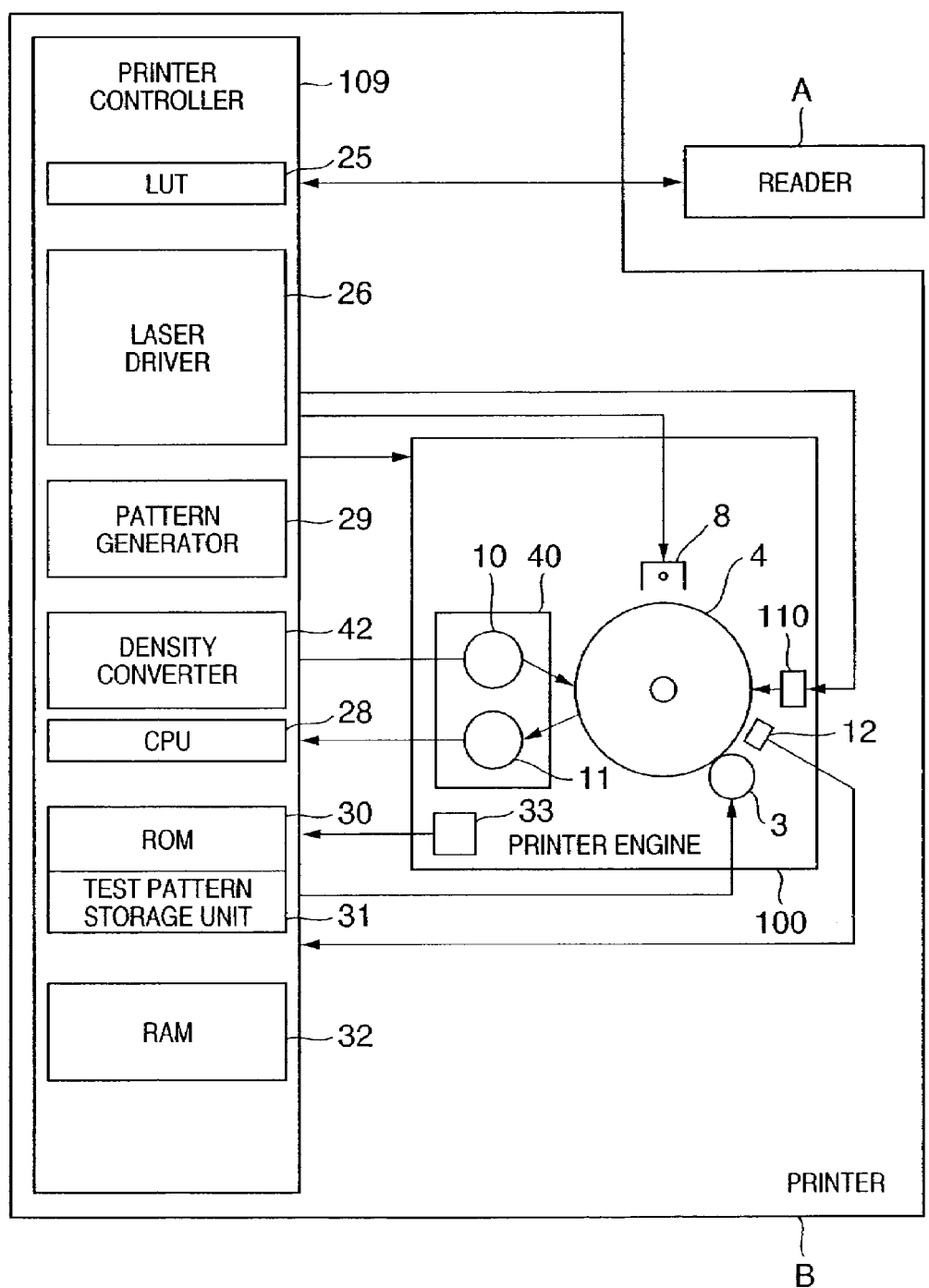
FIG. 4 is a block diagram showing the construction of printer.

FIG. 4 is a block diagram showing the construction of the printer B.

The printer controller 109 has a CPU 28, a ROM 30, a RAM 32, a test pattern storage unit 31, a density converter 42, an LUT 25, a laser driver 26 and the like, and can communicate with the reader A and a printer engine 100. The CPU 28 controls the operation of the printer B, and controls grid potential of the primary charger 8 and developing bias of the developer 3.

The printer engine 100 has the electrostatic drum 4, a photo sensor 40 including the LED 10 and the photo diode 11, the primary charger 8, the laser light source 110, the surface potential sensor 12, the developer 3 and the like provided around the drum. Further, the printer engine has an environment sensor 33 for measurement of water content (or temperature and humidity) in the air within the apparatus.

Construction of Image Processor

Figure 5:
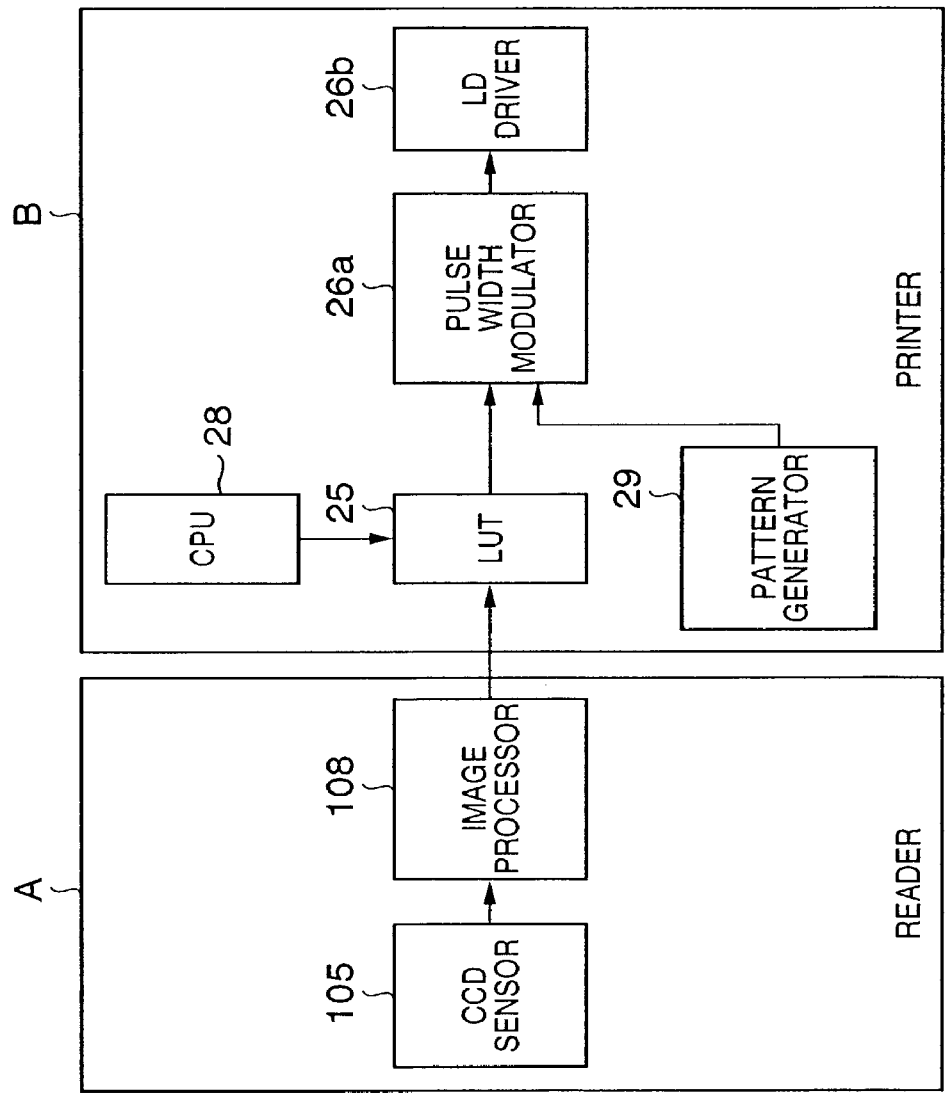
FIG. 5 is a block diagram showing the construction of the image processor to obtain a gray scale image.

FIG. 5 is a block diagram showing the construction of the image processor to obtain a gray scale image.

The image luminance signals obtained by the CCD sensor 105 are converted by the image processor 108 into frame-sequential density signals. In the converted density signals, characteristic correction is performed by using the LUT (γLUT) 25 such that the signals correspond to the printer gamma characteristic at the initial setting time, i.e., the density of original image and that of output image correspond with each other.

Figure 6:
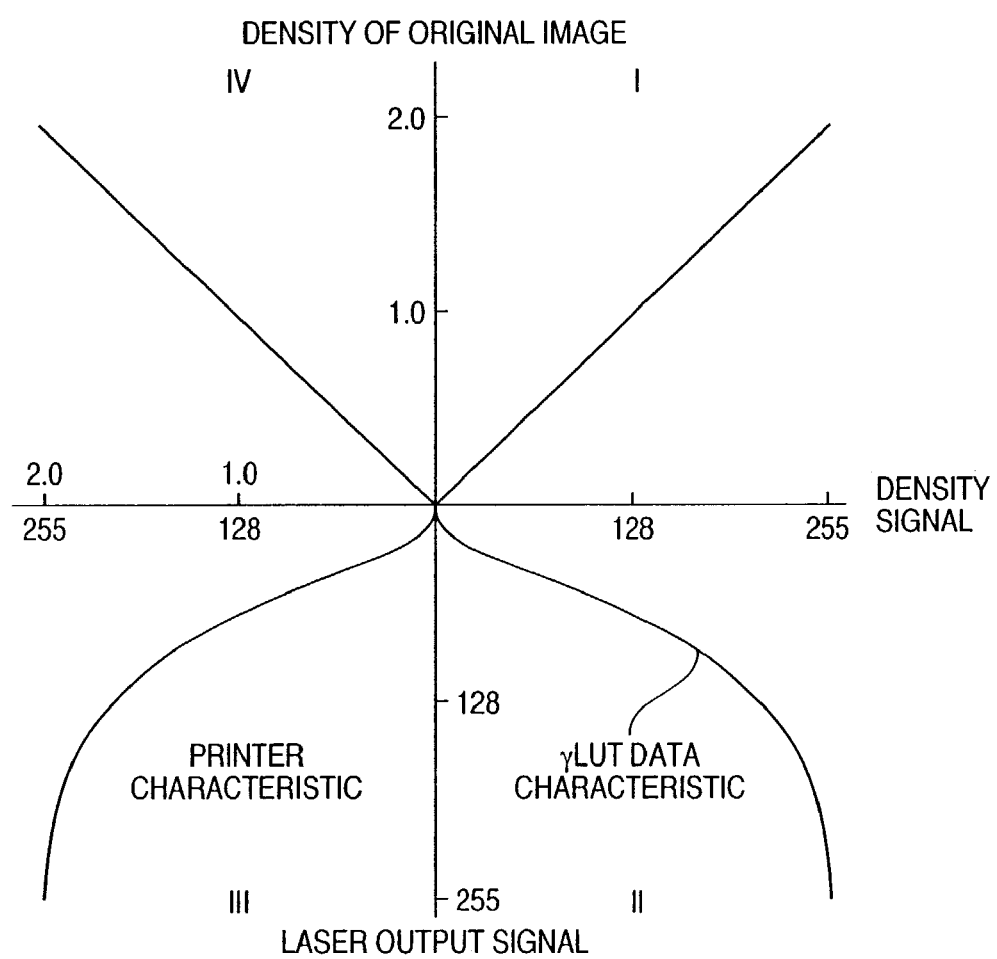
FIG. 6 is a graph showing tonality representation.

FIG. 6 is a graph showing tonality representation. The first quadrant shows a reading characteristic of the reader A for conversion of original image density into a density signal; the second quadrant, a conversion characteristic of the LUT 25 for conversion of density signal into laser output signal; the third quadrant, a printing characteristic of the printer B for conversion of laser output signal into output image density; and the fourth quadrant, the relation between the original image density and output image density, and the graph indicates the total tonality representation characteristic of the image processing apparatus shown in FIG. 1. Note that the tonality representation characteristic in the case of 256 gray scale levels is shown on the assumption of processing of 8-bit digital signal.

To obtain linear total tonality characteristic of the image processing apparatus, i.e., to obtain linear tonality characteristic in the fourth quadrant, correction is performed on nonlinear portions of the printer characteristic in the third quadrant by the LUT 25 in the second quadrant. The image signal in which the tonality characteristic has been converted by using the LUT 25, is converted to a pulse signal corresponding to a dot width by a pulse width modulator (PWM) 26a of the laser driver 26, then sent to an LD driver 26b which on/off controls the laser light source 110. Note that in the present embodiment, the method of tonality representation by pulse width modulation is employed for all the Y, M, C and Bk colors.

Then an electrostatic latent image, which has been gray-scale controlled by change of dot area and which has predetermined tonality characteristic, is formed on the electrostatic drum 4 by scanning of laser light outputted from the laser light source 110, and a gray scale image is reproduced through the processes of the above development, transfer and fixing.

First Control System

Next, as image control in a sequence different from normal image formation to form an image on a print sheet, a first control system regarding stabilization of image representation characteristic of a system including the reader A and the printer B will be described. First, a control system for calibration of the printer B by using the reader A will be described.

Figure 7:
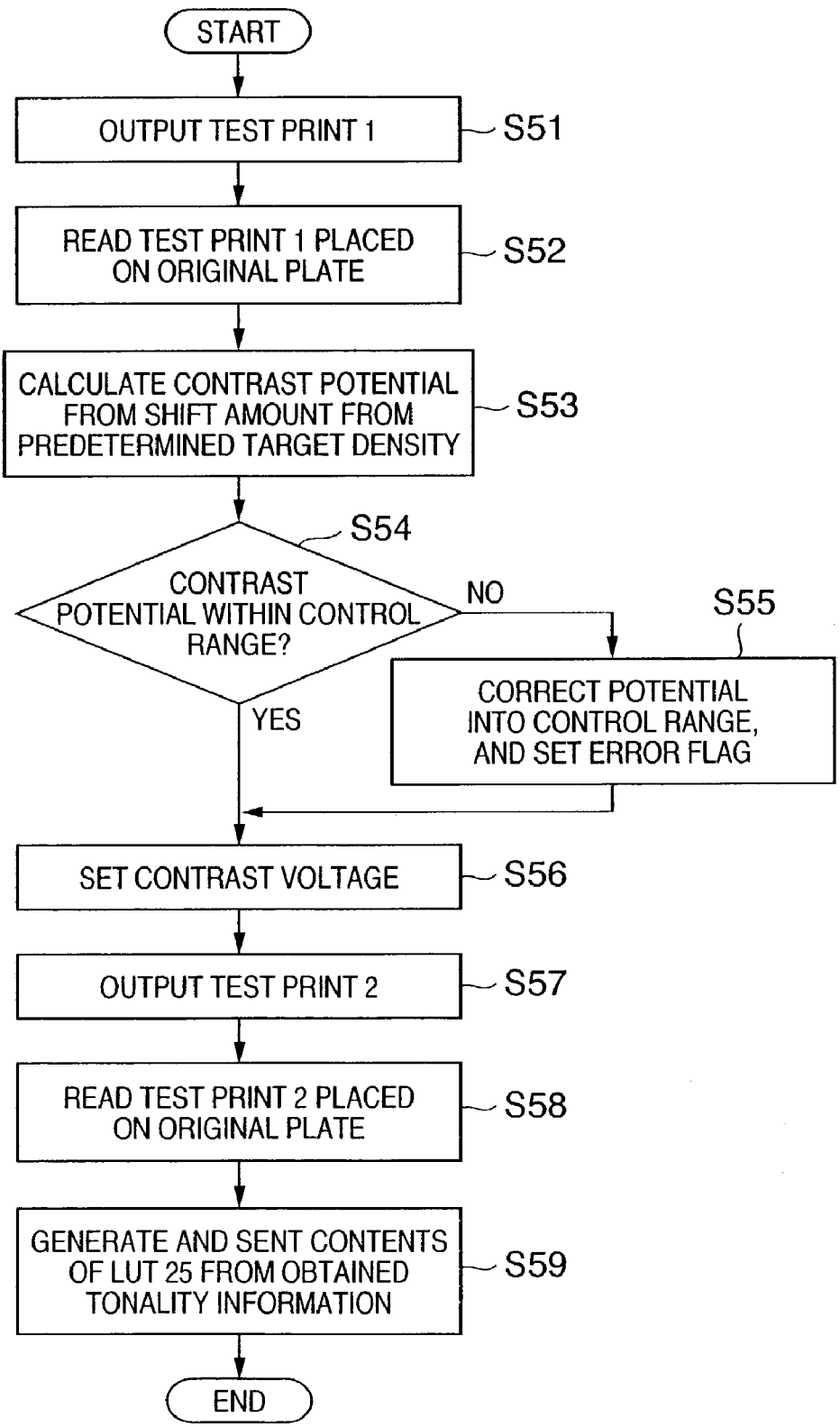
FIG. 7 is a flowchart showing calibration.

FIG. 7 is a flowchart showing the calibration, realized by the CPU 214 which controls the reader A and the CPU 28 which controls the printer B.

When the operator depresses a mode setting button "automatic gray scale correction", provided on the operation unit 217, the calibration shown in FIG. 7 starts. Note that the display unit 218 has a liquid crystal operation panel with touch sensor (touch panel display) as shown in FIGS. 8, 9 and 10.

Figure 8:
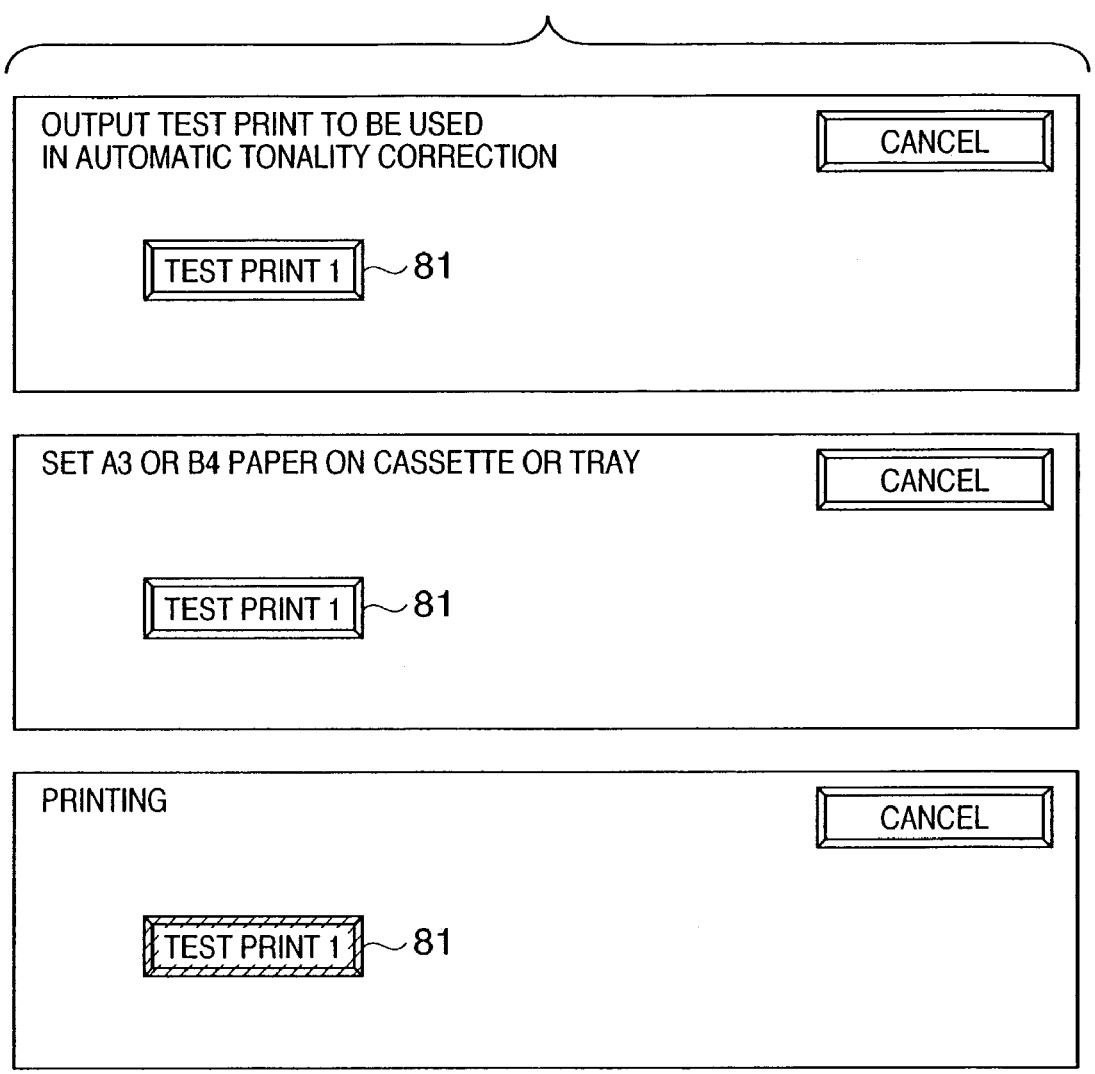
Figure 9:
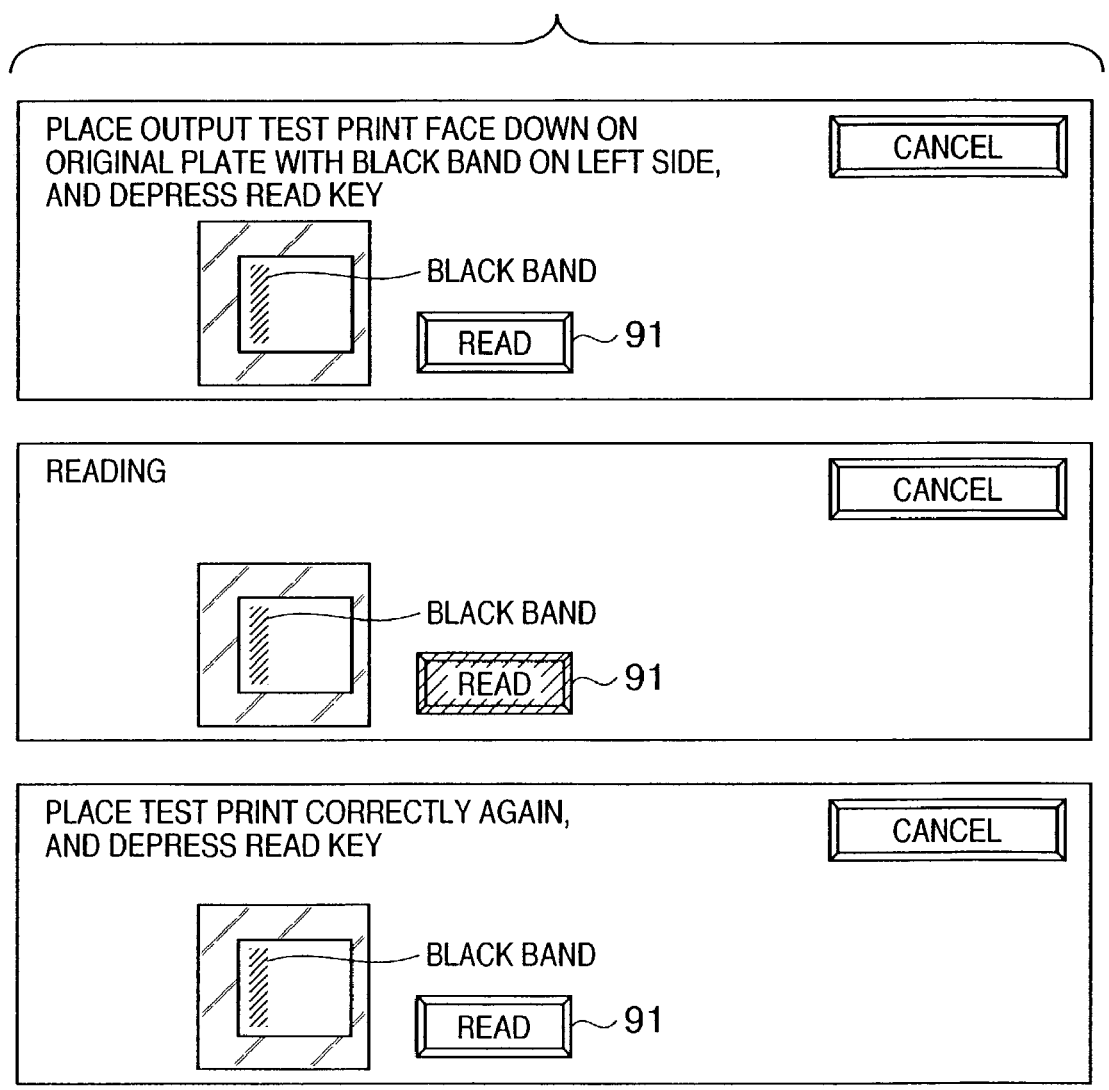
Figure 11:
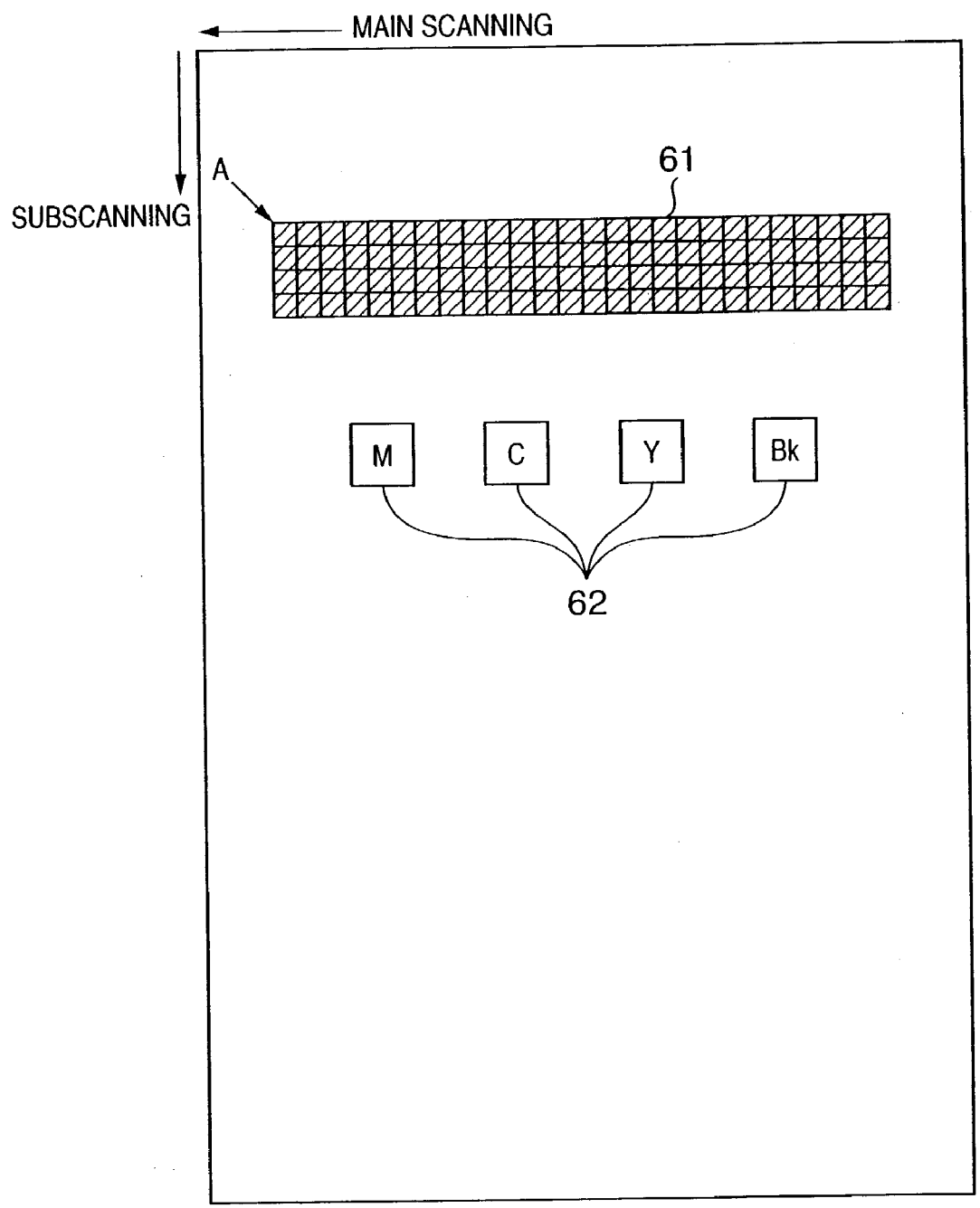
FIG. 11 is an example of test print 1.

First, a start button 81 for a test print 1 as shown in FIG. 8 appears on the display unit 218. When the operator depresses the "test print 1" button, a test pattern 1 as shown in FIG. 11 is print-outputted (S51). Note that FIG. 8 shows the status of printing. At this time, the CPU 214 determines the presence/absence of print sheet for formation of the test print 1, and if there is no print sheet, displays a warning message as shown in FIG. 8 on the display unit 218.

As a contrast potential upon formation of the test print 1, that in a normal status corresponding to the environment is registered as an initial value and the registered value is used. Further, as the image processing apparatus has plural paper cassettes, selection can be made from plural paper sizes such as B4, A3, A4 and B5. However, as a print sheet used in this control is a so-called large sized sheet, i.e., B4, A3, 11×17 or LGR sheet, for avoiding a mistake of placing in a wrong orientation (portrait or landscape) in a later reading operation.

The test pattern 1 shown in FIG. 11 includes a band-like pattern 61 of intermediate gray scale densities of Y, M C and Bk colors. The pattern 61 is visually observed, thereby it is checked whether or not absence of line-included abnormal image, density unevenness and color unevenness is found. Sizes of patch pattern 62 and gray scale patterns 71 and 72 are set such that they are within a reading range in the thrust direction of the CCD sensor 105.

In visual observation, if abnormality is found, the test print 1 is printed again, and if the abnormality is found again, a service-person call, i.e. maintenance by a service person, is required. Note that it may be arranged such that the band pattern 61 is read by the reader A and it is automatically determined whether or not the subsequent control is to be performed based on density information in the thrust direction.

On the other hand, the patch pattern 62 is a maximum density patch of the respective Y, M, C and Bk colors corresponding to the density signal level 255.

Figure 13:
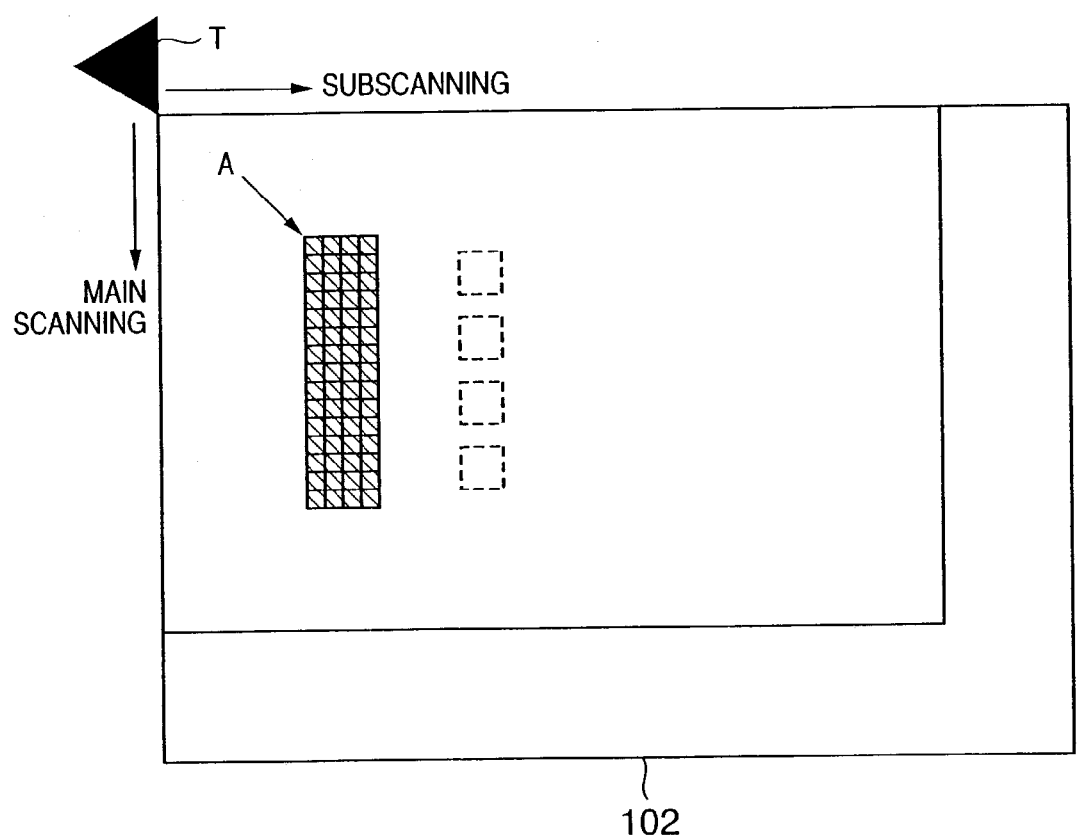
FIG. 13 is an explanatory view of the test print 1 placed on an original plate.

Next, the operator places the test print 1 on the original glass plate 102 as shown in FIG. 13, and depresses a "read" button 91 as shown in FIG. 9. At this time, as shown in FIG. 9, operation guidance is displayed on the display unit 218.

FIG. 13 shows the original glass plate 102 viewed from an upper position. A wedge-shaped mark T in an upper left position is a mark for placement of original. A message of operation guidance is displayed on the display unit 218 such that the band pattern 61 is set on the side of the mark T and the front/rear side of the test print is properly set. That is, the operation guidance has a purpose of preventing erroneous control by placement error of the test print 1.

Upon reading of the patch pattern 62, scanning is gradually performed from the mark T, then an initial density gap point is obtained at a corner of the band pattern 61 (point A in FIG. 11). The relative positions of the respective patches of the patch pattern 62 are calculated from the coordinates of the density gap point A, and the density of the patch pattern 62 is read (S52). Note that during reading of the test print 1, display as shown in FIG. 9 is made. If the orientation and position of the test print 1 are incorrect and reading is impossible, a message as shown in FIG. 9 is displayed such that the operator corrects the position of the test print 1 and depresses the "read" key 91, and the test print 1 is read again.

To convert the RGB values obtained from the patch pattern 62 into optical densities, the following expressions are used. To obtain the same values of commercially-available densitometer, the values are corrected by using a correction coefficient k. Further, it may be arranged such that the RGB luminance information are converted MCYBk density information by using another LUT.

$$M = -km \times \log_{10}(G/255)$$

$$C = -kc \times \log_{10}(R/255)$$

$$Y = -ky \times \log_{10}(B/255)$$

$$Bk = -kk \times \log_{10}(G/255) \quad (2)$$

Figure 15:
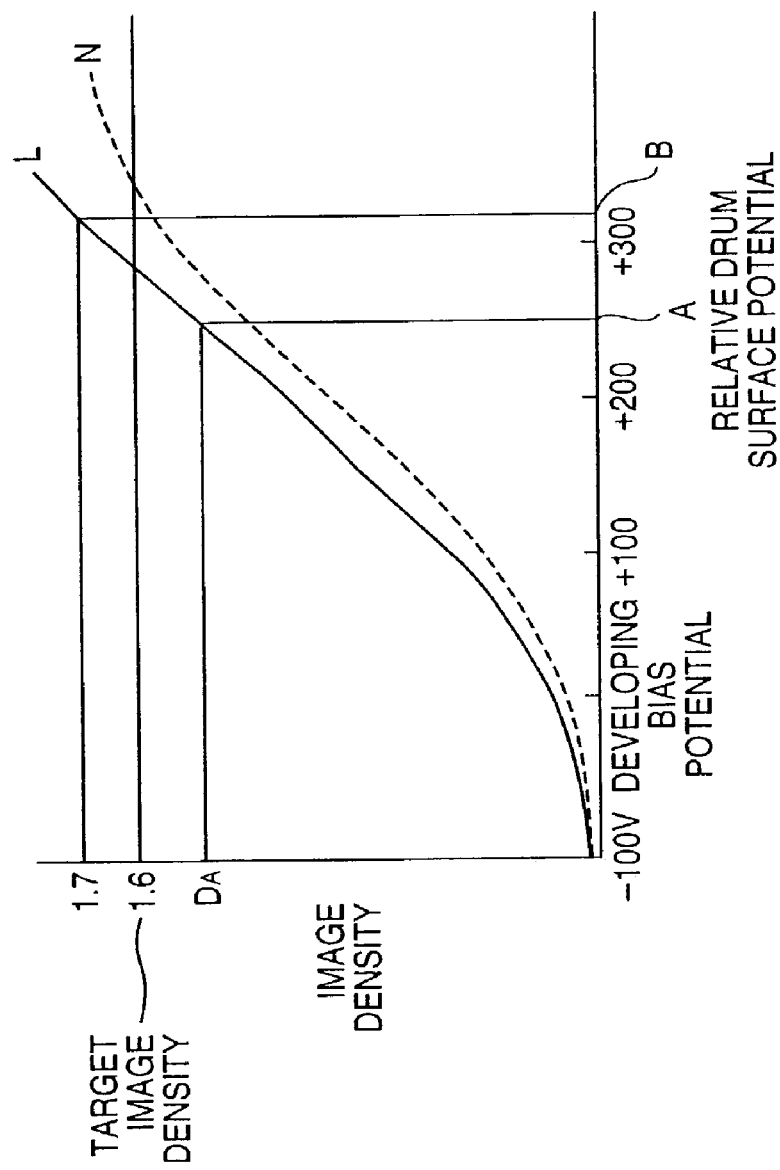
FIG. 15 is a graph showing the relation between relative drum-surface potential of electrostatic drum and image density.

Next, a method for correcting the maximum density from the obtained density information will be described. FIG. 15 is a graph showing the relation between the relative drum-surface potential of the electrostatic drum 4 and image density obtained by the above calculation.

In FIG. 15, alphabet A denotes a contrast potential upon printing of the test print 1 (the difference between developing bias potential and the surface potential of the electrostatic drum 4, charged by the primary charger and then exposed by laser light modulated by a maximum signal value (255 in 8-bit); an DA, the density obtained from the patch pattern 62.

In the maximum density area, the image density is approximately linear with respect to the relative drum surface potential as represented by a solid line L in FIG. 15. However, in the 2-component developing system, if the toner density in the developer 3 is reduced, the image density is nonlinear with respect to the relative drum surface potential in the maximum density area as represented by a broken line N in FIG. 15. Accordingly, in the example of FIG. 15, a final target value of the maximum density is 1.6, however, in consideration of margin of 0.1, a control target value of the maximum density is set to 1.7, and a control amount is determined. A contrast potential B here is obtained from the following expression.

$$B = (A + Ka) \times 1.7/D_A \quad (3)$$

In the expression (3), Ka is a correction coefficient. It is preferable that the value of the coefficient Ka is optimized in accordance with type of developing method.

Figure 16:
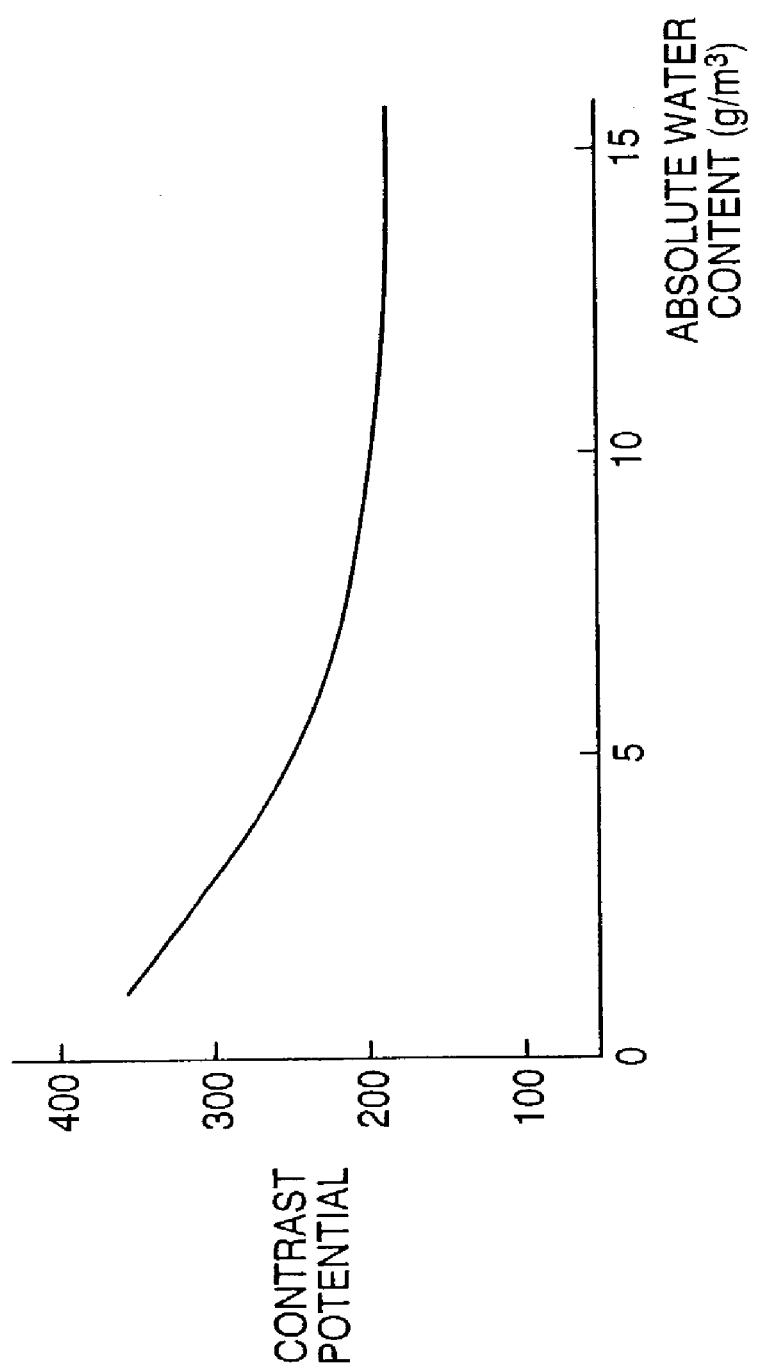
FIG. 16 is a graph showing the relation between absolute water content and contrast potential.

If the contrast potential in electrophotography is not set in correspondence with environment, the density of original image and that of output image do not correspond with each other. Accordingly, as shown in FIG. 16, the contrast potential corresponding to the maximum density is set based on an output from the environment sensor 33 (i.e. absolute water content) which monitors the water content within the apparatus.

Accordingly, to correct the contrast potential, a correction coefficient Vcont.rate1 in the following expression is held in a backed-up RAM or the like.

$$Vcont.rate1 = B/A$$

The image processing apparatus monitors the environmental water content by e.g. 30 minutes. Then each time the value of A is determined based on the result of detection of the water content, the contrast potential is obtained by calculating A×Vcont.rate1.

Figure 17:
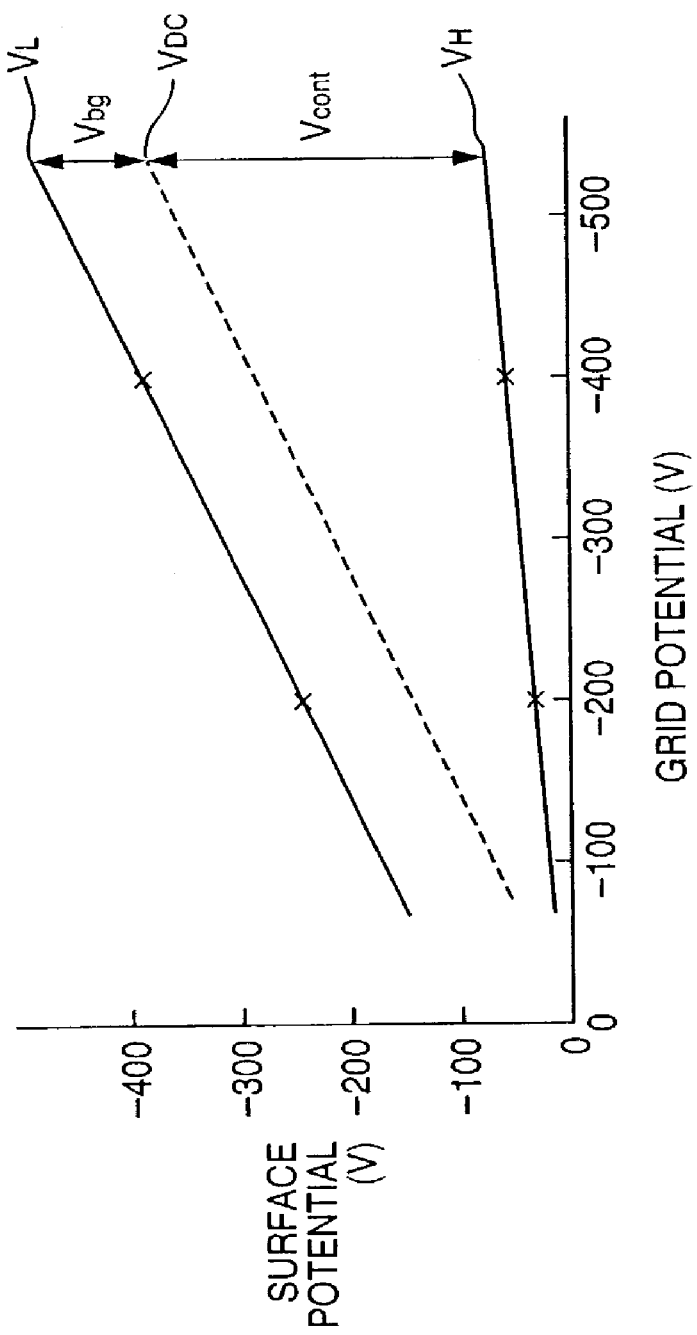
FIG. 17 is a graph showing the relation between grid potential and surface potential.

Next, a method for obtaining grid potential and developing bias potential from the contrast potential will be briefly described. FIG. 17 is a graph showing the relation between the grid potential and the surface potential of the electrostatic drum 4.

The grid potential is set to −200 V, and surface potential $V_L$ of the electrostatic drum 4 exposed by laser light modulated by a minimum signal value, and the surface potential $V_H$ of the electrostatic drum 4 exposed by laser light modulated by a maximum signal value, are measured by the surface potential sensor 12. Similarly, the potentials $V_L$ and $V_H$ when the grid potential is set to −400 V are measured. Then the relation between the grid potential and the surface potential is obtained by interpolation and extrapolation of the −200 V and −400 V data. Note that the control to obtained the potential data is referred to as potential measurement control.

Next, developing bias $V_{DC}$ is set from the potential $V_L$ with a difference Vbg (e.g. 100 V) set to avoid toner fogging in image. The contrast potential Vcont is the difference voltage between the developing bias $V_{DC}$ and the potential $V_H$. As the value of Vcont increases, the maximum density value increases, as described above.

The grid potential and the developing bias to obtain the contrast potential B obtained by calculation are obtained from the relation as shown in FIG. 17. Accordingly, the CPU 28 obtains the contrast potential such that the maximum density is higher than the final target value by 0.1, and determines the grid potential and the developing bias potential so as to obtain the contrast potential (S53).

Next, it is determined whether or not the determined contrast potential is within a control range (S54). If the potential is without the range, it is determined that there is abnormality in the developer 3 or the like, and an error flag is set such that the developer 3 of corresponding color is checked. The status of the error flag can be checked by a maintenance-service person in a predetermined service mode. Further, upon occurrence of abnormality, the contrast potential is corrected into the control range as much as possible, and the control is continued (S55).

The CPU 28 controls the grid potential and the developing bias to obtain the contrast potential set as above (S56).

FIG. 28 is a graph showing the density conversion characteristic after the control. In the present embodiment, the printer characteristic in the third quadrant is as represented by a solid line J by control to set the maximum density to a value higher than the final target value. If this control is not performed, there is a possibility that the printer characteristic is as represented by a broken line H in which the maximum density is less than 1.6. If the printer characteristic corresponds to the broken line H, as the maximum density cannot be increased by using the LUT 25, the density area between the density $D_H$ and the value 1.6 cannot be reproduced no matter how the LUT 25 is set. As represented by the solid line J, if the printer characteristic is higher than the maximum density by far, the density reproduction area can be ensured as shown in the total tonality characteristic in the fourth quadrant by correction using the LUT 25.

Figure 12:
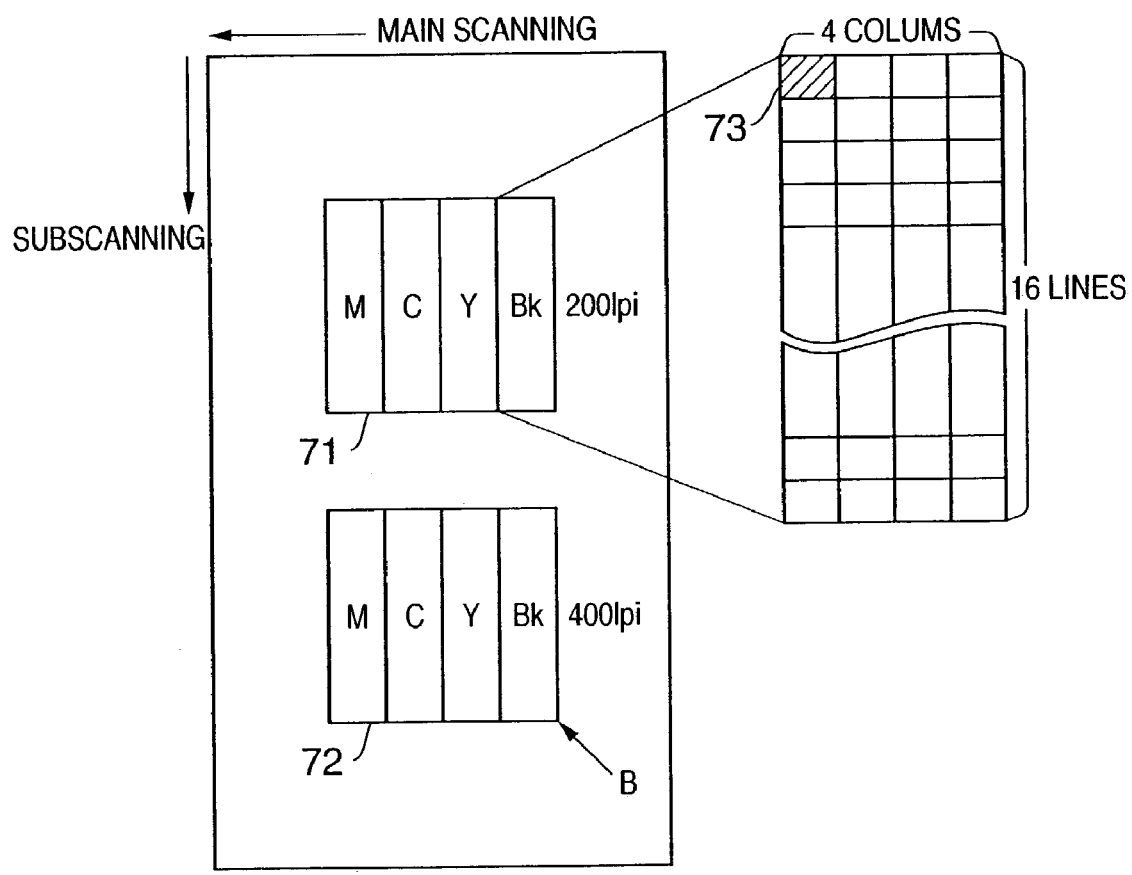
FIG. 12 is an example of test print 2.

Next, as shown in FIG. 10, a print start button 150 for test print 2 appears on the display unit 218. When the operator depresses the "test print 2" button, the test print 2 as shown in FIG. 12 is print-outputted (S57). Note that FIG. 10 shows the status of printing.

As shown in FIG. 12, the test print 2 has a gradation patch group of 4×16 (64 levels) patches of the respective Y, M, C and Bk colors. The 64 gray scale levels out of the total 256 levels are mainly assigned to a lower density area, and thinned in a higher density area, for excellently controlling tonality characteristic in a highlight position.

In FIG. 12, a patch pattern 71 is a 200 lpi (line/inch) patch group; a patch pattern 72, a 400 lpi patch group. Image formation in the respective resolutions can be realized by providing plural periods of signal such as a triangular wave used in the pulse width modulator 26a for comparison with an image signal of processing object image.

Note that the image processing apparatus of the present embodiment forms a gray scale image such as a photograph in 200 lpi, and characters and line art, in 400 lpi, based on the output signal from the black character determination unit as described above. The pattern at the same gray scale level may be outputted in these two resolutions, however, if the difference between the resolutions greatly influences the tonality characteristic, it is preferable that the pattern is outputted at a gray scale level corresponding to the resolution.

Note that the test print 2 is printed based on an image signal generated from a pattern generator 29 without operating the LUT 25.

Figure 14:
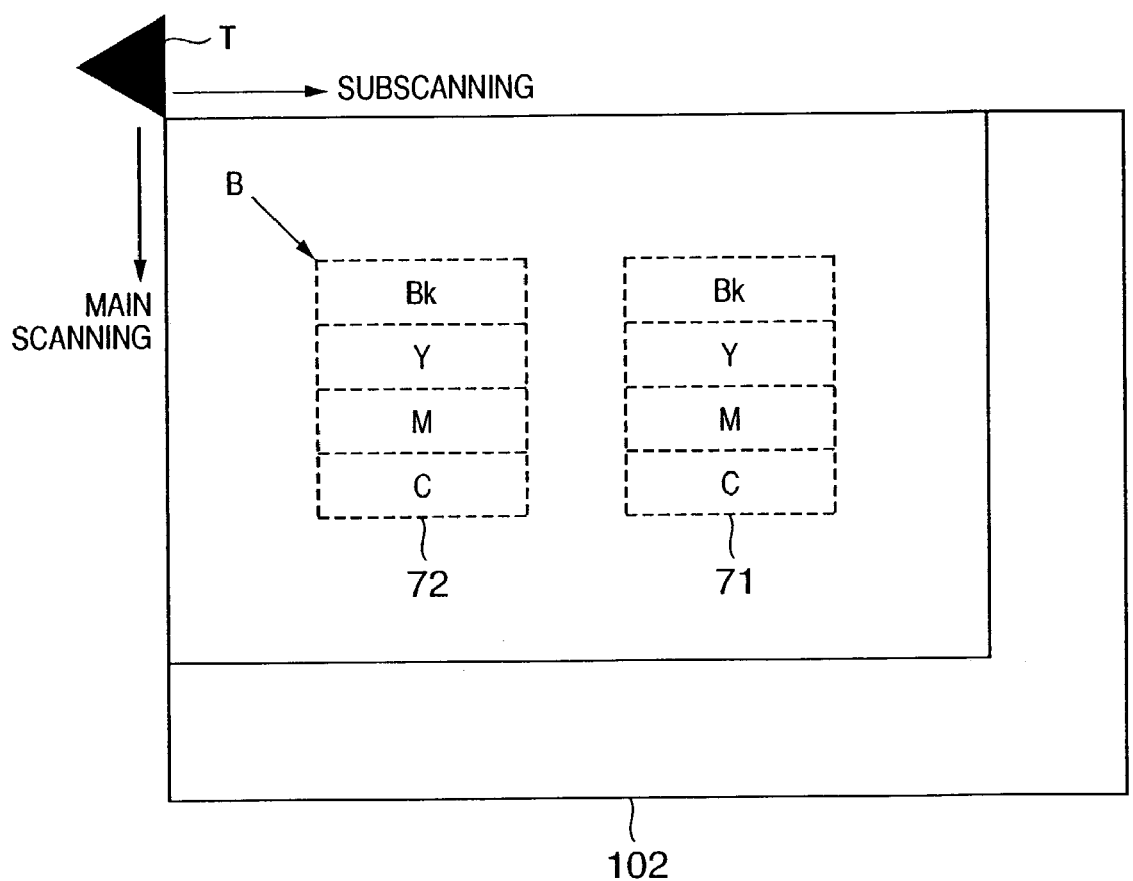
FIG. 14 is an explanatory view of the test print 2 placed on an original plate.

FIG. 14 is an explanatory view of the test print 2 placed on the original glass plate 102. A message is displayed on the display unit 218 (See FIG. 10) such that the Bk patch pattern is on the side of the mark T and the sheet is placed with proper front/rear side, thus a control error due to placement error of the test print 2 is prevented.

Upon reading of the patch patterns 71 and 72, scanning is gradually performed from the mark T, then an initial density gap point is obtained at a corner of the patch pattern 72 (point B in FIG. 12). The relative positions of the respective patches of the patch patterns 71 and 72 are calculated from the coordinates of the density gap point B, and the densities of the patch patterns 71 and 72 are read (S58). Note that during reading of the test print 2, display as shown in FIG. 10 is made.

Figure 18:
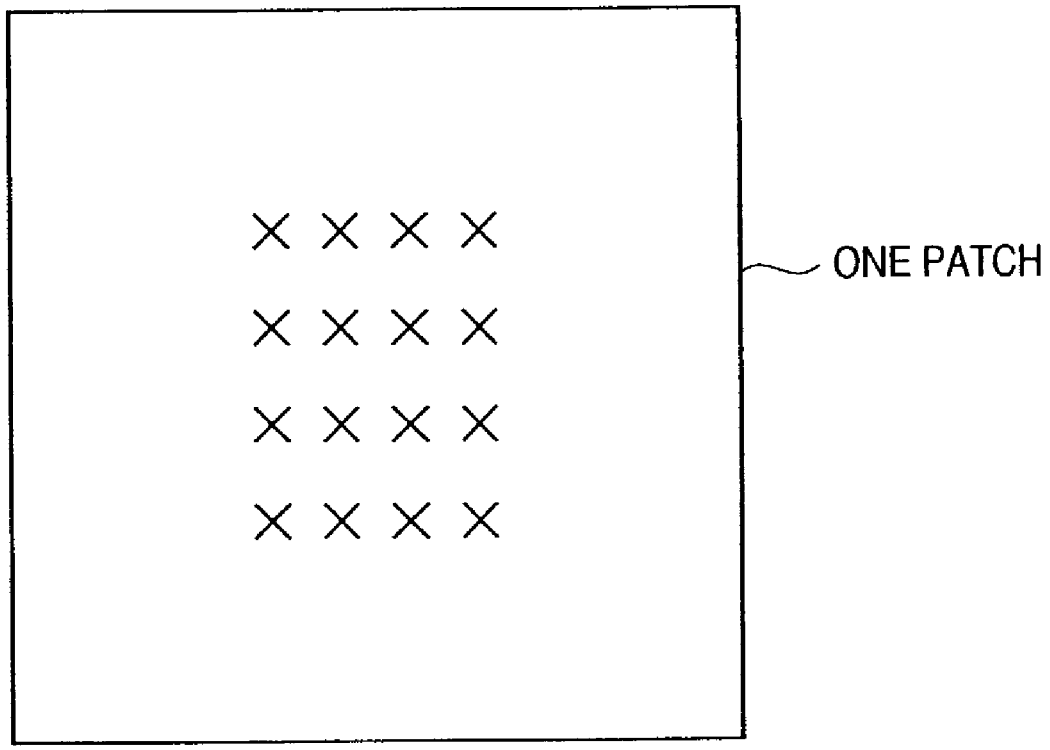
FIG. 18 is an explanatory view of density reading points in a patch.

As shown in FIG. 18, a value read from one patch (e.g. a patch 73 in FIG. 12) is obtained by calculating a mean value of values read from 16 reading points in the patch. Note that it is preferable that the number of reading points is optimized in accordance with reading device and image forming device.

Figure 19:
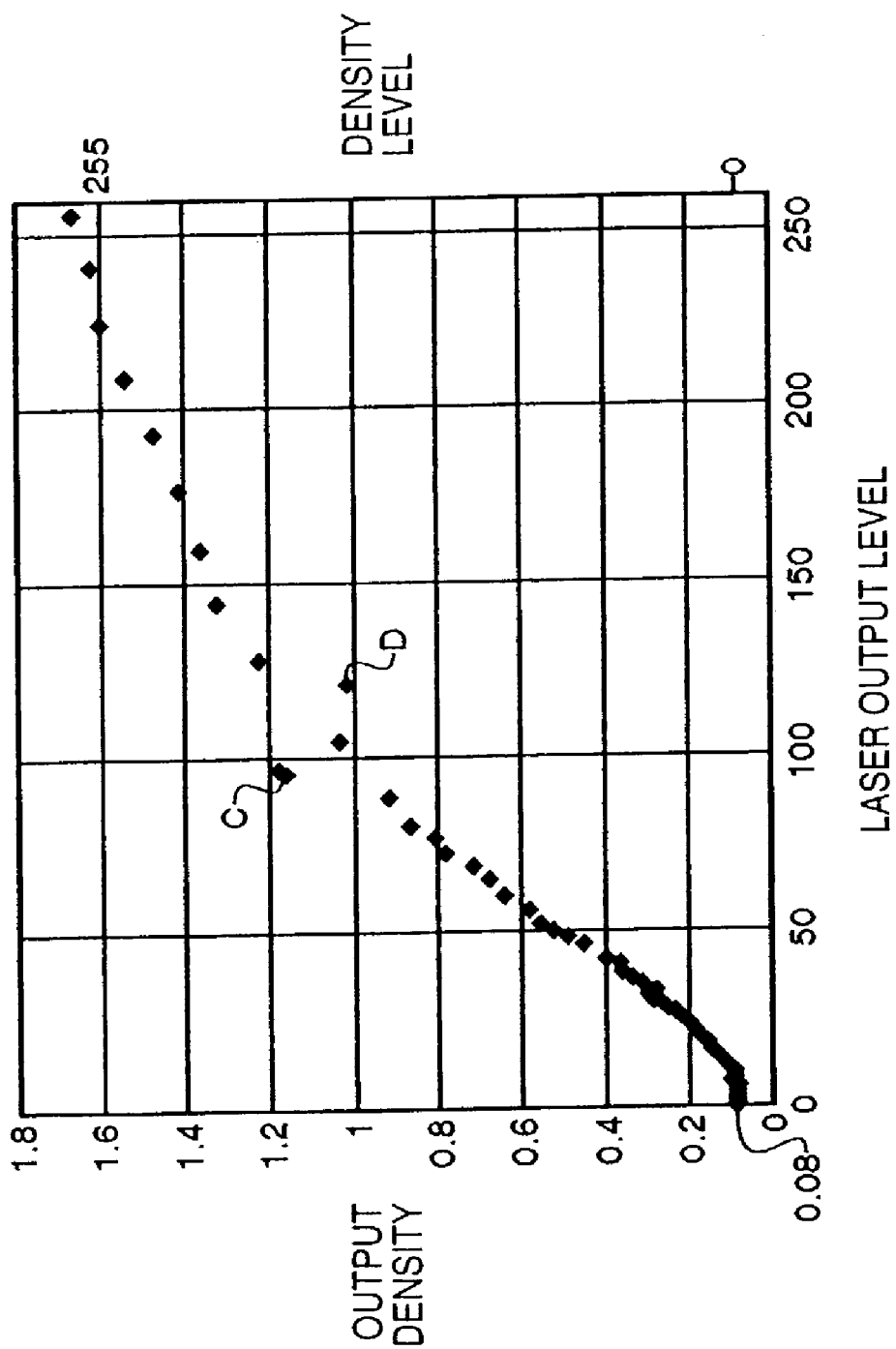
FIG. 19 is a graph showing the relation between density read from the test print 2 and laser output level.

FIG. 19 is a graph showing the relation between output density converted from the RGB signals obtained from the respective patches into density values by the above-described conversion to optical density and laser output level (image signal value). In FIG. 19, in the right side vertical axis, a base density (e.g. 0.08) of the print sheet is set to 0, and a maximum density target value 1.60 is normalized to level 255.

If the density of patch is particularly high as represented by a point C in FIG. 19 or particularly low as represented by a point D, there may be contamination on the original glass plate 102 or defect in the test pattern. In such case, to maintain continuity of data string, the slope of the data string is limited. For example, if the slope of the data string is over 3, the slope is fixed to 3, and in the case of data with minus slope, the value is set to the same value as that of 1-value lower density patch.

In the LUT 25, an inverse conversion characteristic to the characteristic as shown in FIG. 19 is set (S59). That is, the density level (vertical axis in FIG. 19) is changed to the input level (density signal in FIG. 6), and the laser output level (horizontal axis in FIG. 19), to the output level (laser output signal in FIG. 6). Regarding a level not corresponding to the patch, a value is obtained by interpolation calculation. At this time, regarding a zero input level, a condition for obtaining a zero output level is set.

As described above, the contrast potential control by the first control system and generation of gamma conversion table are completed, and the display as shown in FIG. 10 is made on the display unit 218.

Tonality Supplemental Control

Next, correction of tonality after the control by the first control system will be described.

The image processing apparatus of the present embodiment performs correction on a maximum density in correspondence with environmental change, by the above contrast potential control, and further performs tonality correction (referred to as "tonality supplemental control").

Figure 20:
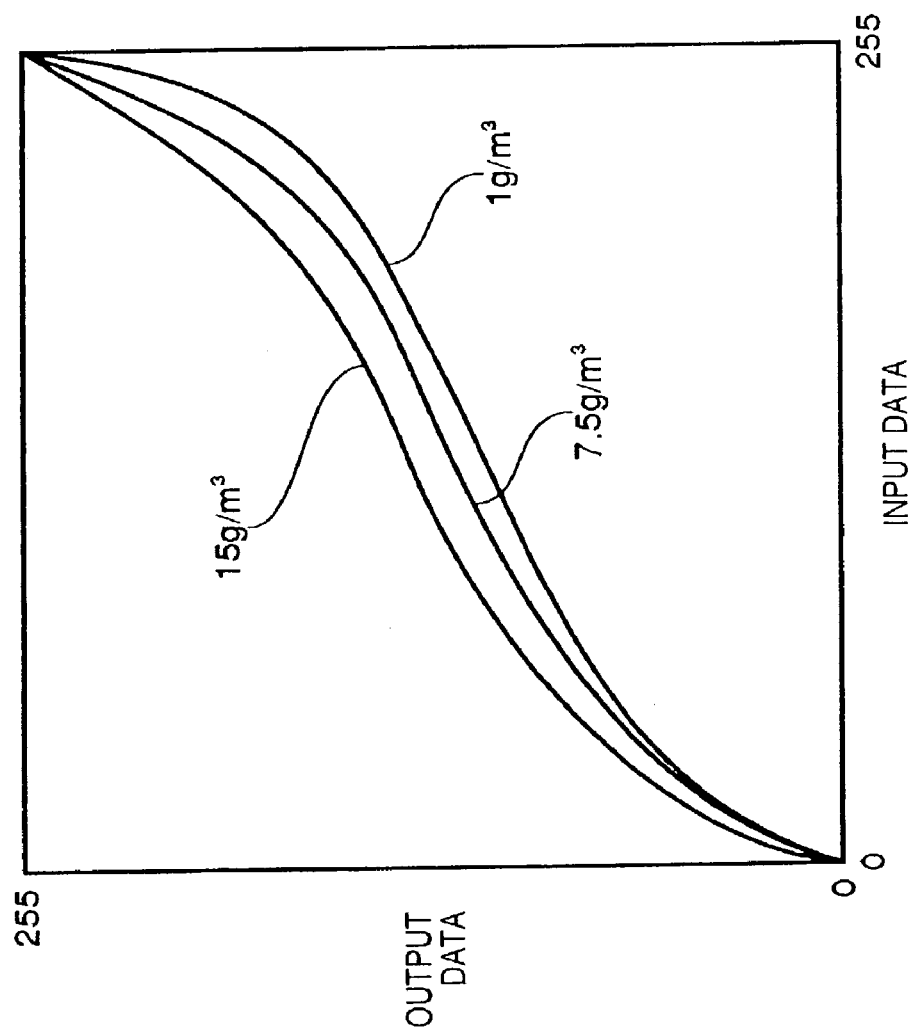
FIG. 20 is a graph for explanation of LUT corresponding to water content.

As shown in FIG. 20, in consideration of occurrence of environmental change or the like in a status where the first control system is disabled, table data of the LUT 25 corresponding to the environment (e.g. water content) is stored in the ROM 30.

The first control system performs the control, and the table data of the LUT 25 (referred to as "LUT$_1$") obtained as the result of control, and the water content at the time are stored in a battery backed-up area or the like of the RAM 30. Note that the table data in the ROM 30 corresponding to the water content is referred to as LUT$_A$.

Hereinafter, every time the environment changes, the table data in the ROM 30 corresponding to the water content at the time (referred to as "LUT$_B$") is obtained, and the data LUT$_1$ is corrected by using the data LUT$_A$ and LUT$_B$, as in the following expression. That is, the difference between the data LUT$_B$ and LUT$_A$ corresponding to the change of water content is added to the data LUT$_1$, thereby appropriate table data LUTpresent of the LUT 25 can be obtained without using control by the first control system.

$$\text{LUTpresent} = \text{LUT}_1 + (\text{LUT}_B - \text{LUT}_A) \quad (4)$$

By this supplemental control, the input/output characteristic of the image processing apparatus can be corrected to a linear characteristic, and as a result, variation in density tonality characteristic of each apparatus can be suppressed, and a normal status can be easily set.

As the supplemental control is released to users of image processing apparatuses, the tonality control can be performed in accordance with necessity upon determination that the tonality characteristic of the image processing apparatus is degraded, thus the tonality characteristic of the system including the reader and printer can be easily corrected.

Further, correction on the above-described environmental change can be appropriately performed.

As a maintenance-service person can select enable/disable status of the first control system, upon maintenance of the image processing apparatus, the first control system is disabled and the status of the image processing apparatus can be easily and quickly determined. Note that in a case where the first control system is disabled, the normal contrast potential and table data of the LUT 25 of the model are read from the ROM 30 and set in the CPU 28 and the LUT 25. Accordingly, upon maintenance, as the shift of characteristic from the normal status is clear, optimum maintenance can be efficiently performed.

[Second Control System]

Next, a description will be made about a second control system as image control performed during normal image formation, for stabilization of image reproduction characteristic of the printer B.

The second control system detects the density of patch formed on the electrostatic drum 4 and corrects the LUT 25, thereby stabilizes the image reproducibility.

Figure 21:
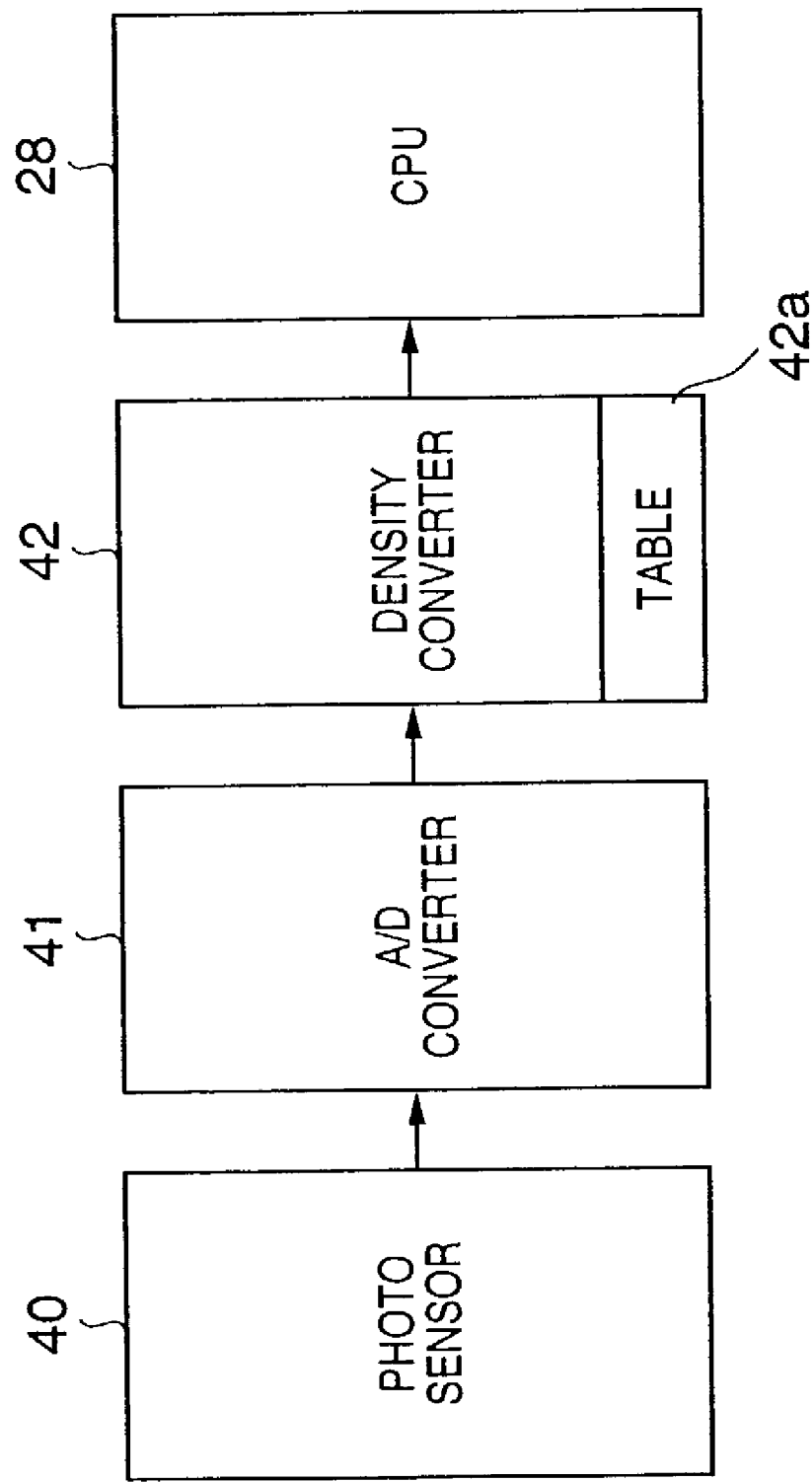
FIG. 21 is a block diagram showing a circuit construction for processing an output signal from a photo sensor.

FIG. 21 is a block diagram showing a circuit construction for processing an output signal from the photo sensor 40. Reflection light (near infrared light) from the electrostatic drum 4, inputted into the photo sensor 40, is converted to an electric signal. The electric signal of 0 to 5 V is converted by an A/D converter 41 into an 8-bit digital signal, and converted by the density converter 42 into density information.

Note that as the toner used in the present embodiment, yellow toner, magenta toner and cyan toner, in which the respective color materials are distributed with styrene copolymer resin as binder. Further, the electrostatic drum 4 is an OPC drum having about 40% reflectivity for near infrared light (960 nm), however, the electrostatic drum 4 may be an amorphous silicon drum as long as it has approximately the same reflectivity. Further, the photo sensor 40 detects only regular reflection light from the electrostatic drum 4.

Figure 22:
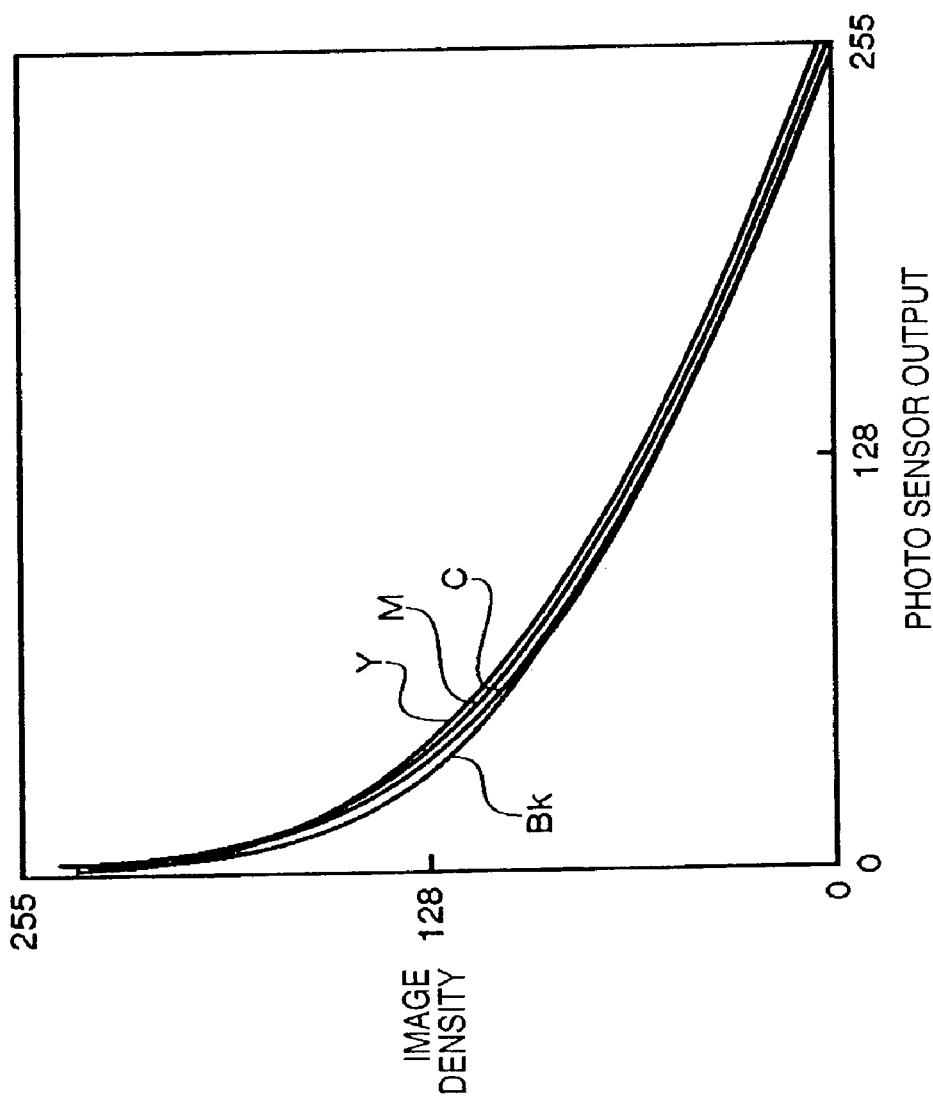
FIG. 22 is a graph showing the relation between photo-sensor output and output image density when a patch density is stepwisely changed.

FIG. 22 is a graph showing the relation between photosensor output and output image density when the density of patch formed on the electrostatic drum 4 are stepwisely changed by area tonality of the respective colors. Note that the output from the photo sensor 40 in a status where the toner is not attached to the electrostatic drum 4 is set to 5 V i.e. level 255. As shown in FIG. 22, as the area coverage by the respective toner increases and the image density increases, the output from the photo sensor 40 decreases.

From these characteristics, a table 42a (See FIG. 21) for conversion of sensor output into density signal is provided for the respective colors, thereby the densities of the respective colors can be read with high precision.

Figure 23:
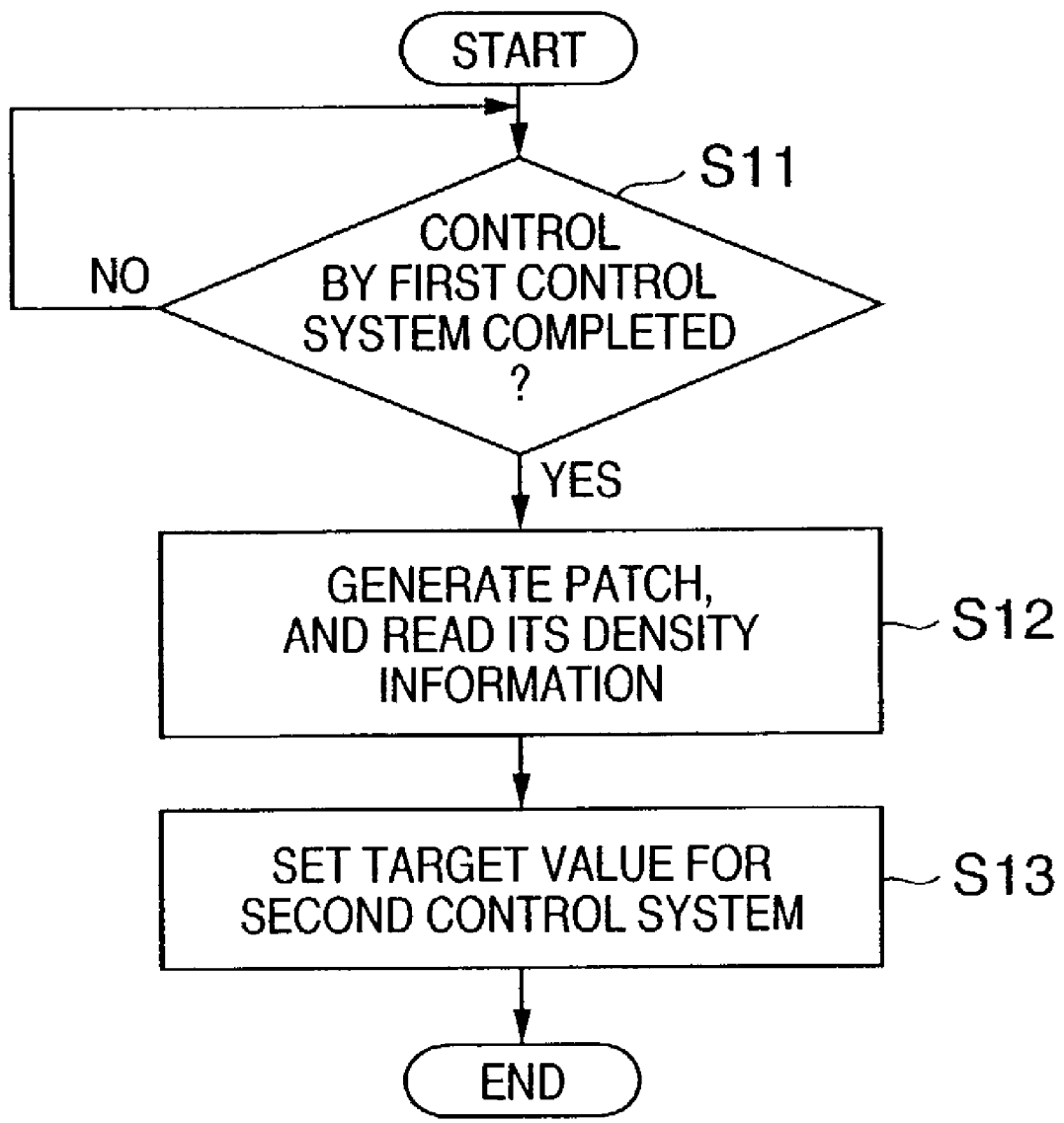
FIG. 23 is a flowchart showing target value setting processing.

The second control system has a purpose of maintaining stabilization of color reproducibility attained by the first control system, and holds the status immediately after the completion of control by the first control system as a target value. FIG. 23 is a flowchart showing target value setting processing.

When the control by the first control system has been completed (S11), Y, M, C and Bk color patches are formed on the electrostatic drum 4, then reflection light from the patches is read by the photo sensor 40, and converted into density information (S12). Then, the target value of the second control system is set (S13).

Note that as laser output upon patch formation, a density signal at level 128 is used for the respective colors. At this time, the table data for the LUT 25 and the contrast potential obtained by the first control system are employed.

Figure 24:
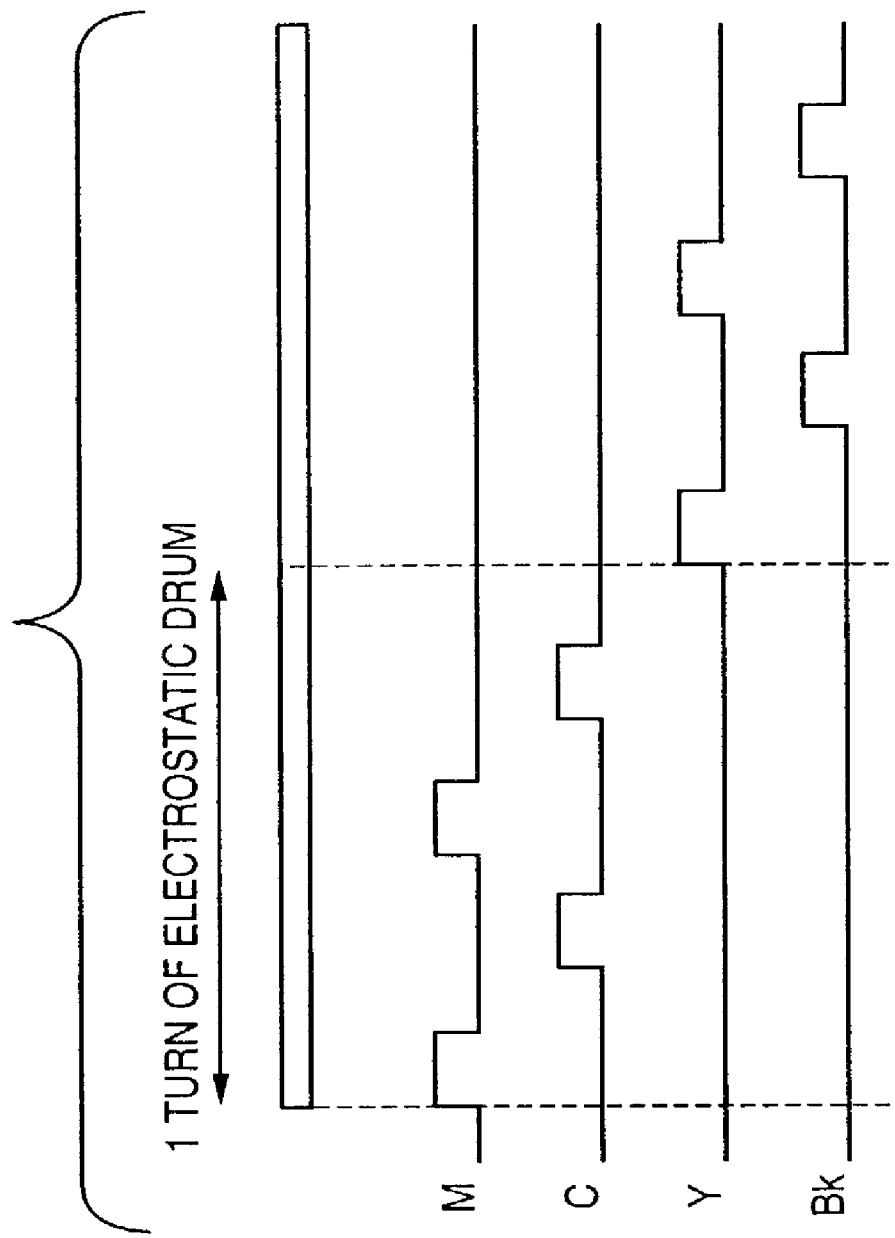
FIG. 24 is a timing chart showing a sequence of patch formation on the electrostatic drum.

FIG. 24 is a timing chart showing a sequence of patch formation on the electrostatic drum 4.

Figure 25:
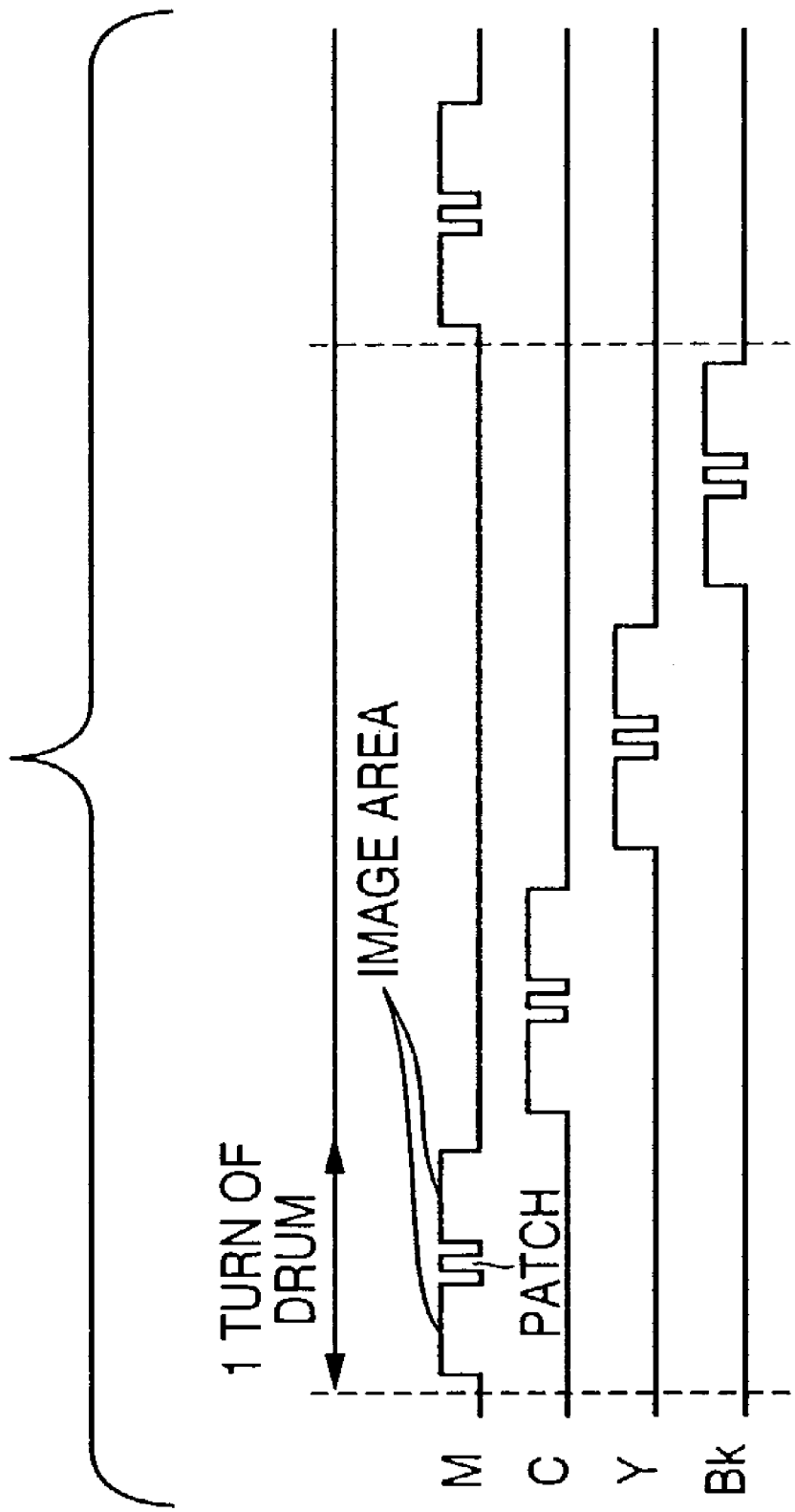
FIG. 25 is a timing chart showing a sequence of patch formation in a non-image area on the electrostatic drum during normal image formation.

In the present embodiment, the electrostatic drum has a comparatively large diameter. To obtain density information accurately and efficiently in short time, patches of the same color are formed in point-symmetrical positions on the electrostatic drum 4 in consideration of eccentricity of the electrostatic drum 4, and density information is obtained from a mean value of plural values obtained by measuring these patches. Further, patches for 2 colors are formed per 1 turn of the electrostatic drum 4, and as shown in FIG. 25, density information for 4 colors is obtained by turning the electrostatic drum 4 twice. Then the density information corresponding to the image density level 128 is stored as a target value of the second control system in the RAM 32 or the like. The target value is updated each time the control by the first control system is performed.

The second control system forms patches in a non-image area during normal image formation, detects the density of the patches and corrects the table data for the LUT 25 obtained by the first control system when necessary. Since the non-image area is the space on the electrostatic drum 4 where the print sheet wound around the drum does not exist, the patches are formed in the area. FIG. 25 is a timing chart showing a sequence of patch formation in the non-image area on the electrostatic drum 4 during normal image formation in a case where an A4-sized full-color image is continuously outputted.

It is important that the laser output upon patch formation is equal to that when the target value was set, and a density signal at level 128 is used for the respective colors. The table data for the LUT 25 and contrast potential are equal to those in normal image formation at that time. That is, the table data for the LUT 25 obtained by the first control system is corrected by the second control system, and the result of correction is employed as a gamma correction table.

The level 128 density signal is corrected such that the patch density becomes 128 by the LUT 25 having a density scale where the density level 1.6 is normalized to 255, however, the image characteristic of the printer B is unstable and there is a possibility that the characteristic changes at any time. Accordingly, the density as a result of measurement is not always 128. The second control system corrects the table data for the LUT 25 obtained by the first control system based on the shift value $\Delta D$ between the density signal and the result of measurement.

Figure 26:
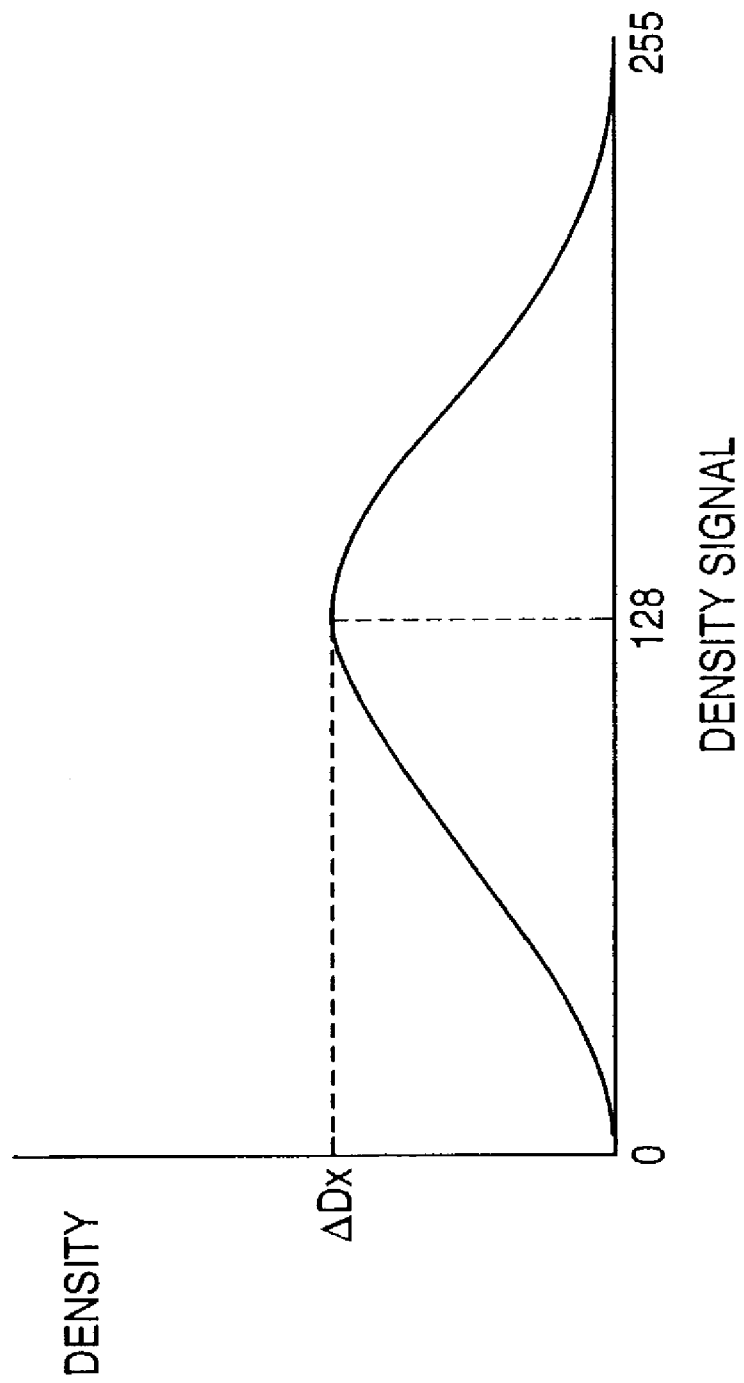
FIG. 26 is a graph for explanation of γLUT correction table.

FIG. 26 is a graph for explanation of general correction table for density signal ($\gamma$LUT correction table) in a case where the shift of the patch density from the level 128 density signal is $\Delta Dx$. The $\gamma$LUT correction table is previously stored in the ROM 30 or the like, and upon control by the second control system, the $\gamma$LUT correction table is normalized such that $\Delta Dx$ becomes $\Delta D$, and table data to cancel the characteristic of the normalized $\gamma$LUT correction table is added to the table data for the LUT 25, thereby the LUT 25 is corrected.

The timing of rewriting the LUT 25 (correction) differs by color. In each color, when preparation for rewriting is made, rewriting is performed based on a TOP signal during a period where laser light scanning (exposure) of the color is not performed.

The value $\Delta D$ is a shift amount between the target value previously obtained from the patch formed by using the LUT 25 and the density currently obtained from the patch formed by the LUT 25. However, in every patch formation, as the LUT 25 previously corrected by the second control system is used, the shift amount $\Delta Dn$ between the read patch density and the target value is different from the shift value $\Delta D$. Therefore, the integral value of the $\Delta Dn$ is stored as $\Delta D$.

Figure 29:
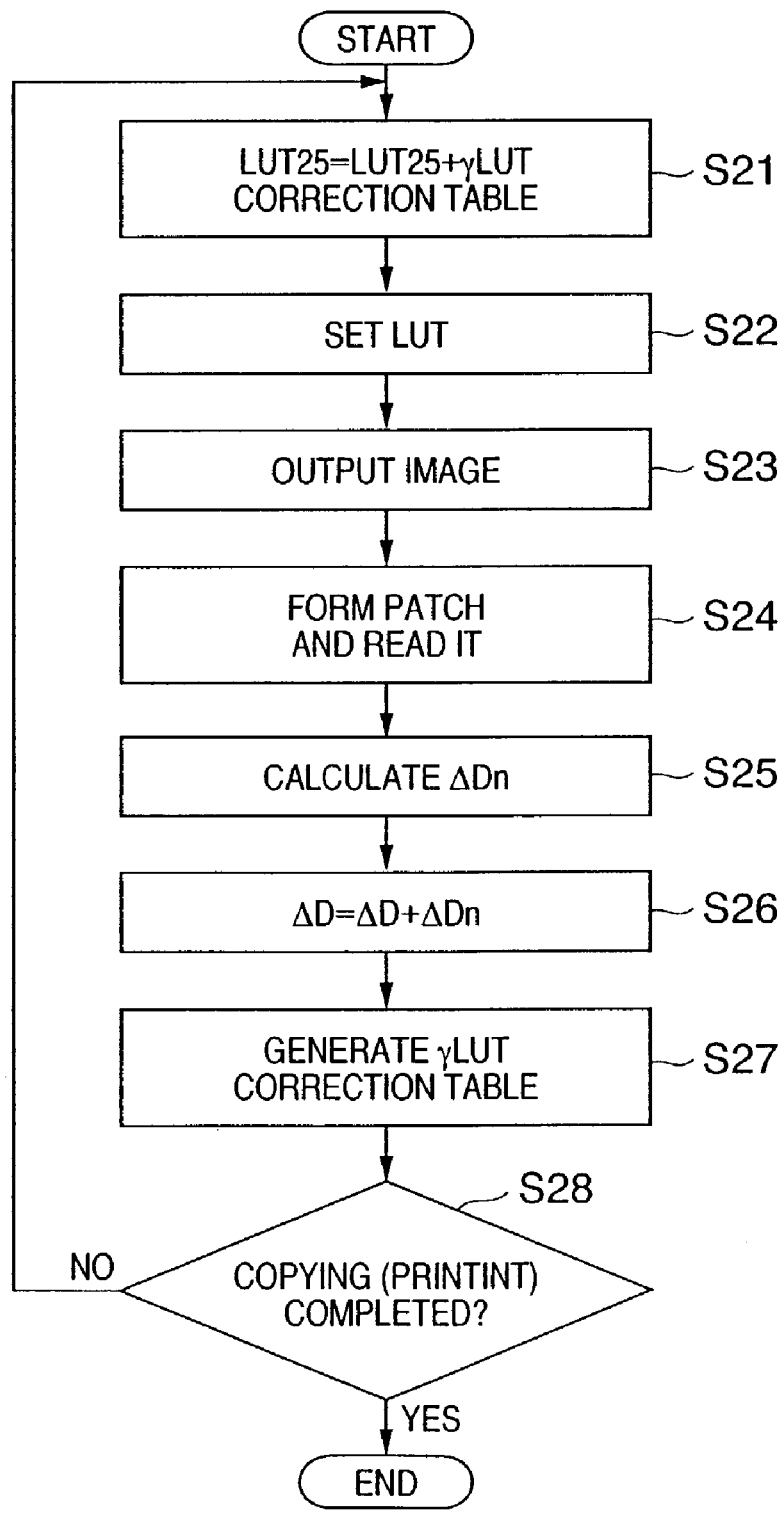
FIG. 29 is a flowchart showing γLUT correction table generation processing.

FIG. 29 is a flowchart showing $\gamma$LUT correction table generation processing which is started upon start of normal image formation.

First, the table data for the LUT 25 is corrected by the $\gamma$LUT correction table previously obtained by the second control system (S21), then the table data as a result of correction is set in the LUT 25 (S22), and an image is outputted by using the LUT 25 (S23). At this time, the patches are formed on the electrostatic drum 4 and the densities of the patches are read (S24). Then the shift amount $\Delta Dn$ is calculated (S25), the integral value $\Delta D=\Delta D+\Delta Dn$ is obtained (S26), and the $\gamma$LUT correction table is generated (S27). Thereafter, it is determined whether or not the print job is continued (S28), and if the job is continued, the process returns to step S21, while if the job is ended, the process ends.

The second control system is always started if patches can be formed in the non-image area during normal image formation. That is, in a case where an A4-sized full-color image is continuously outputted, the LUT 25 is corrected once for the respective colors per 2 images, or in a case where only 1 image is outputted, the LUT 25 is corrected for the respective colors per 1 image.

On the other hand, the first control system requires manual work. Accordingly, the control by the first control system cannot be frequently performed. Therefore, it may be arranged such that a maintenance-service person performs the control by the first control system upon installation of the image processing apparatus, and if no problem occurs in an output image, the tonality characteristic is maintained during a period of control by the second control system. In a case where the tonality characteristic has gradually changed, the control by the first control system (calibration) is performed. By this arrangement, the tonality characteristic can be appropriately maintained through the lifetime of the image processing apparatus.

Second Embodiment

Next, the image processing apparatus according to a second embodiment of the present invention will be described. Note that in the second embodiment, constituent elements approximately the same as those in the first embodiment have the same reference numerals and detailed explanations of the elements will be omitted.

In the second embodiment, the density of the patch formed in the control by the above-described second control system is assigned to a low density area.

The purpose of the tonality control of the present embodiment is stabilization of color tone. Generally, in a low density area, a color difference due to variation of density increases. Accordingly, the patch density is assigned to a low density area and the precision of tonality control in the low density area is improved, thereby variation of color tone is effectively suppressed.

Figure 27:
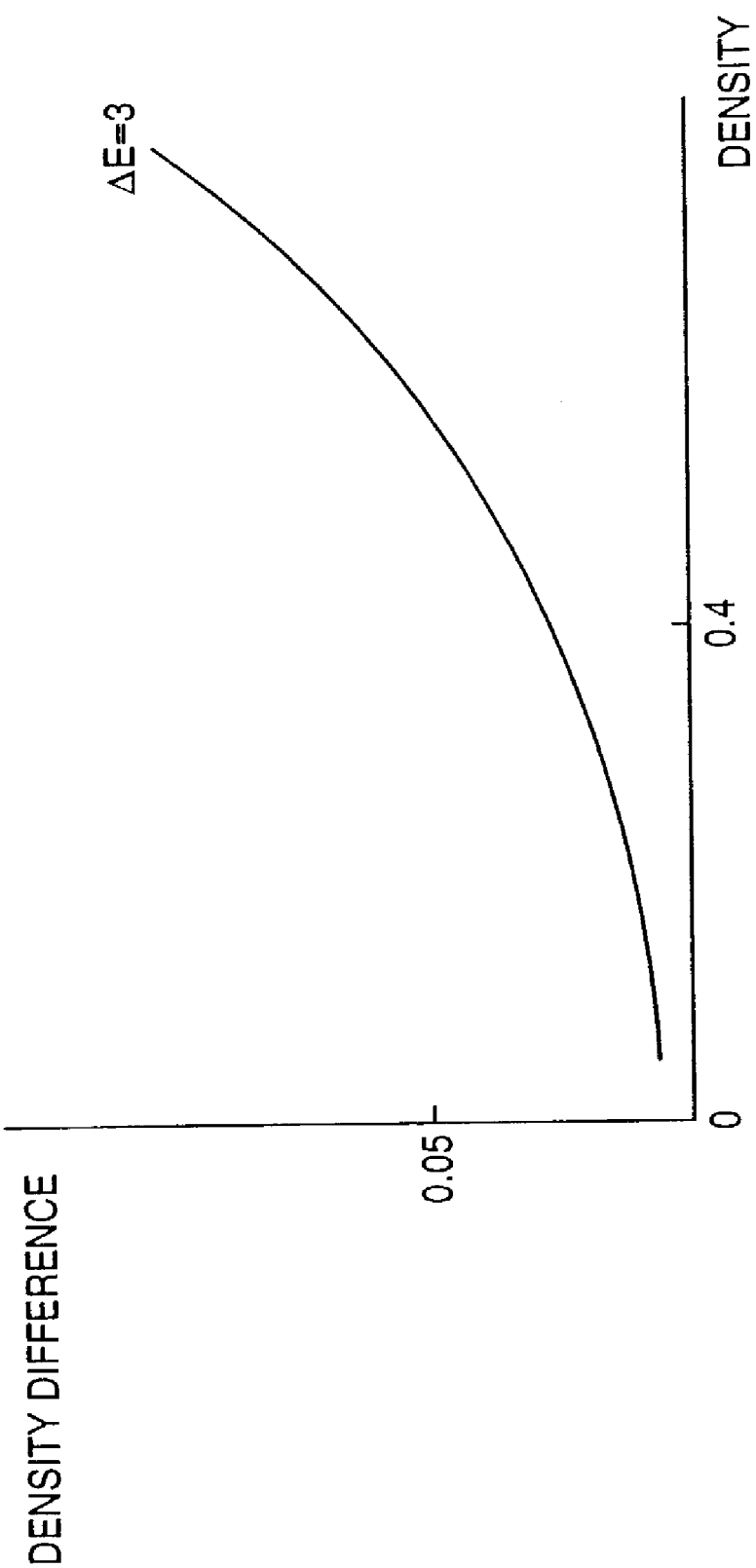
FIG. 27 is a graph showing the relation between density difference and color difference.

FIG. 27 is a graph showing the relation between density difference and color difference in the copier according to the second embodiment. In consideration of the relation between density difference and color difference shown in FIG. 27, the sensitivity of sensor shown in FIG. 22 and the sensitivity to variation read from FIG. 26, a density signal at level 64 (around density 0.4) is used for the respective colors as the laser output upon patch formation in the second embodiment, upon setting of target value and upon normal image formation.

When a low-density patch is read by the photo sensor 40, the status of the surface of the electrostatic drum as a base has considerable influence. Accordingly, prior to patch formation, the density of the surface of the electrostatic drum 4 is measured by the photo sensor 40 in the position of patch formation, and the measured patch density (output from the photo sensor 40) is corrected based on the result of measurement.

Upon setting of the target value, the number of turns of the electrostatic drum 4 is increased by once for the measurement of the base in addition to the sequence described in the first embodiment. The sequence of patch formation in the non-image area on the electrostatic drum 4 during normal image formation is the same as that in the first embodiment, but the difference is that the density of the base is measured upon previous turning when a job is started.

According to the second embodiment, as the tonality characteristic can be sufficiently stabilized around the patch density, variation in tonality in a low density area can be suppressed, and variation of color tone can be effectively suppressed.

Modification of Embodiments

Note that in the above-described embodiments, the electrostatic drum is used as an image holding member to hold an electrostatic latent image and toner image, however, the present invention is applicable to an electrostatic belt as a belt-type image holding member having an electrostatic layer on its surface. Further, the present invention is applicable to an image forming apparatus which has an intermediate transfer member on which a toner image is temporarily transferred from the electrostatic drum for transfer of the toner image onto a print medium such as a print sheet or film. In these apparatuses, the density information as input information of the second control system is obtained from patches formed on the electrostatic belt and the intermediate transfer member.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) holding software program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium holding the program code constitutes the invention.

Further, the storage medium, such as a floppy disk, a hard disk, an optical disk, a magneto-optical disk, a CD-ROM, a CD-R, a DVD, a magnetic tape, a non-volatile type memory card, and ROM can be used for providing the program code.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for forming a color image on an image holding member based on image data, and transferring and fixing the color image onto a print medium, comprising:
    a first detector, arranged to detect an image characteristic of the image transferred and fixed onto the print medium;
    a second detector, arranged to detect an image characteristic of an image formed on the image holding member;
    a controller, arranged to transfer and fix a first pattern to detect an image characteristic onto the print medium by a sequence different from normal image formation, and to control a density correcting condition for image formation on the image holding member based on the image characteristic of the first pattern, detected by said first detector; and
    a corrector, arranged to form a second pattern to detect an image characteristic on the image holding member after completion of control of the density correcting condition for image formation by said controller, and to hold the image characteristic of the second pattern detected by said second detector as reference information, and, in the normal image formation, to form the second pattern without an image formation area on the image holding member in the normal image formation, and to correct the density correcting condition using a difference between an image characteristic of the second pattern detected by said second detector in the normal image formation and the reference information under correcting processing for the density correcting condition.

2. The apparatus according to claim 1, wherein said corrector integrates the difference, and in the normal image formation, corrects the density correcting condition for image formation based on an integral value of the difference.

3. The apparatus according to claim 1, wherein said second detector has a regular reflection type optical sensor.

4. The apparatus according to claim 1, further comprising a sensor arranged to detect an environmental condition in said apparatus, wherein said controller corrects the density correcting condition for image formation in correspondence with the environmental condition detected by said sensor.

5. The apparatus according to claim 1, further comprising a switch arranged to allow a maintenance-service person to select an enabled/disabled status of said controller.

6. A control method of an image processing apparatus for forming a color image on an image holding member based on image data, and transferring and fixing the color image onto a print medium, comprising the steps of:
    transferring and fixing a first pattern to detect an image characteristic onto the print medium by a sequence different from normal image formation;
    detecting the image characteristic of the first pattern transferred and fixed onto the print medium;
    controlling a density correcting condition for image formation on the image holding member based on the image characteristic of the first pattern;
    forming a second pattern to detect an image characteristic on the image holding member after completion of control of the density correcting condition for image formation;
    detecting the image characteristic of the second pattern formed on the image holding member as reference information;
    forming the second pattern without an image formation area on the image holding member in the normal image formation; and
    detecting an image characteristic of the second pattern formed without the image formation area in the normal image formation, and correcting the density correcting condition using a difference between the detected image characteristic and the reference information under correcting processing for the density correcting condition.

7. The method according to claim 6, further comprising the step of integrating the difference, and in the normal image formation, correcting the density correcting condition for image formation based on an integral value of the difference.

8. The method according to claim 6, further comprising the steps of:
 detecting an environmental condition in the apparatus; and
 correcting the density correcting condition for image formation in correspondence with the detected environmental condition.

9. The method according to claim 6, further comprising the step of selecting an enabled/disabled status of the density correcting condition for image formation based on an input by a maintenance-service person.

10. A computer-readable storage medium storing program code for realizing a control method of an image processing apparatus for forming a color image on an image holding member based on image data, and transferring and fixing the color image onto a print medium, the program code comprising process procedure code for:
 transferring and fixing a first pattern to detect an image characteristic onto the print medium by a sequence different from normal image formation;
 detecting the image characteristic of the first pattern transferred and fixed onto the print medium;
 controlling a density correcting condition for image formation on the image holding member based on the image characteristic of the first pattern;
 forming a second pattern to detect an image characteristic on the image holding member after completion of control of the density correcting condition for image formation;
 detecting the image characteristic of the second pattern formed on the image holding member as reference information;
 forming the second pattern without an image formation area on the image holding member in the normal image formation; and
 detecting an image characteristic of the second pattern formed without the image formation area in the normal image formation, and correcting the density correcting condition using a difference between the image characteristic and the reference information under correcting processing for the density correcting condition.

11. The medium according to claim 10, wherein the program code further comprising process procedure code for integrating the difference, and in the normal image formation, correcting the density correcting condition for image formation based on an integral value of the difference.

12. The medium according to claim 10, wherein the program code further comprising process procedure code for:
 detecting an environmental condition in the apparatus; and
 correcting the density condition for image formation in correspondence with the detected environmental condition.

13. The medium according to claim 10, wherein the program code further comprising process procedure code for selecting an enabled/disabled status of the density correcting condition for image formation based on an input by a maintenance-service person.

14. An image processing apparatus for forming a color image on an image holding member based on image data, and transferring and fixing the color image onto a print medium, comprising:
 a first detector, arranged to detect an image characteristic of the image transferred and fixed onto the print medium;
 a second detector, arranged to detect an image characteristic of an image formed on the image holding member;
 a controller, arranged to transfer and fix a first pattern to detect an image characteristic onto the print medium by a sequence different from normal image formation, and to control a density correcting condition for image formation on the image holding member based on the image characteristic of the first pattern, detected by said first detector; and
 a corrector, arranged to form a second pattern to detect an image characteristic on the image holding member after completion of control of the density correcting condition for image formation by said controller, and to hold the image characteristic of the second pattern detected by said second detector as reference information, and, in the normal image formation, to form the second pattern on a non-image formation area on the image holding member in the normal image formation, and to correct the density correcting condition using a difference between an image characteristic of the second pattern detected by said second detector in the normal image formation and the reference information under correcting processing for the density correcting condition.

15. The apparatus according to claim 14, wherein said corrector integrates the difference, and in the normal image formation, corrects the density correcting condition for image formation based on an integral value of the difference.

16. The apparatus according to claim 14, wherein said corrector performs the correction using the difference at plural times when a plurality of images are continuously formed in the normal image formation.

17. The apparatus according to claim 14, further comprising a sensor arranged to detect an environmental condition in said apparatus,
 wherein said controller corrects the density correcting condition for image formation in correspondence with the environmental condition detected by said sensor.

18. The apparatus according to claim 14, further comprising a switch arranged to allow a maintenance-service person to select an enabled/disabled status of said controller.

19. A control method of an image processing apparatus for forming a color image on an image holding member based on image data, and transferring and fixing the color image onto a print medium comprising the steps of:
 transferring and fixing a first pattern to detect an image characteristic onto the print medium by a sequence different from normal image formation;
 detecting the image characteristic of the first pattern transferred and fixed onto the print medium;
 controlling a density correcting condition for image formation on the image holding member based on the image characteristic of the first pattern;
 forming a second pattern to detect an image characteristic on the image holding member after completion of control of the density correcting condition for image formation;
 detecting the image characteristic of the second pattern formed on the image holding member as reference information;

forming the second pattern on a non-image formation area on the image holding member in the normal image formation; and detecting an image characteristic of the second pattern formed on the non- image formation area in the normal image formation, and correcting the density correcting condition using a difference between the detected image characteristic and the reference information under correcting processing for the density correcting condition.

20. The method according to claim 19, further comprising the step of integrating the difference, and in the normal image formation, correcting the density correcting condition for image formation based on an integral value of the difference.

21. The method according to claim 19, wherein the detecting and correcting step performs the correction using the difference at plural times when a plurality of images are continuously formed in the normal image formation.

* * * * *